US012410824B2

(12) United States Patent
Zhan et al.

(10) Patent No.: US 12,410,824 B2
(45) Date of Patent: Sep. 9, 2025

(54) HYDRAULIC OIL-CIRCUIT SYSTEM AND HYDRAULIC JACK

(71) Applicant: T-MAX (HANGZHOU) TECHNOLOGY CO., LTD., Zhejiang (CN)

(72) Inventors: Yongyong Zhan, Zhejiang (CN); Xinfa Du, Zhejiang (CN); Songfeng Wang, Zhejiang (CN); Binhao Ruan, Zhejiang (CN)

(73) Assignee: T-MAX (HANGZHOU) TECHNOLOGY CO., LTD., Zhejiang (CN)

( * ) Notice: Subject to any disclaimer, the term of this patent is extended or adjusted under 35 U.S.C. 154(b) by 722 days.

(21) Appl. No.: 17/731,409

(22) Filed: Apr. 28, 2022

(65) Prior Publication Data

US 2022/0381265 A1 Dec. 1, 2022

(30) Foreign Application Priority Data

May 25, 2021 (CN) ......................... 202110573888.8
May 25, 2021 (CN) ......................... 202110573889.2
(Continued)

(51) Int. Cl.
*F15B 15/14* (2006.01)
*B66F 3/28* (2006.01)
(Continued)

(52) U.S. Cl.
CPC .............. *F15B 15/149* (2013.01); *B66F 3/28* (2013.01); *B66F 3/38* (2013.01); *B66F 3/42* (2013.01); *F15B 1/26* (2013.01)

(58) Field of Classification Search
CPC ...... B66F 3/28; B66F 3/38; B66F 3/42; F15B 15/149; F15B 1/26
(Continued)

(56) References Cited

U.S. PATENT DOCUMENTS 5,524,868 A * 6/1996 Decker ..................... B66F 3/42 254/93 H
6,042,085 A * 3/2000 Tang ......................... B66F 3/42 254/93 H
(Continued)

FOREIGN PATENT DOCUMENTS

CN 1182047 A 5/1998
CN 2294340 Y 10/1998
(Continued)

OTHER PUBLICATIONS

Qin Baojun, "ISR for PCT Application PCT/CN2021/095858", Feb. 25, 2022, CNIPA, China.
(Continued)

*Primary Examiner* — Seahee Hong
(74) *Attorney, Agent, or Firm* — Bridgeway IP Law Group, PLLC; Jihun Kim

(57) ABSTRACT

A hydraulic oil-circuit system and a hydraulic jack are proposed. The hydraulic oil-circuit system includes a hydraulic cylinder, an oil loading chamber, a storage oil chamber and an oil unloading pipeline; a piston is arranged in the hydraulic cylinder and divides the hydraulic cylinder into a first hydraulic oil chamber and a second hydraulic oil chamber; the first hydraulic oil chamber has a first oil port, and the second hydraulic oil chamber has a second oil port; the first oil port and the second oil port are both in unidirectional communication with the oil loading chamber and are both in unidirectional communication with the storage oil chamber; and the oil unloading pipeline connects the oil loading chamber and the storage oil chamber.

18 Claims, 17 Drawing Sheets

(30) Foreign Application Priority Data

May 25, 2021 (CN) ......................... 202121137294.4
May 25, 2021 (CN) ......................... 202121140078.5

(51) Int. Cl.
*B66F 3/38* (2006.01)
*B66F 3/42* (2006.01)
*F15B 1/26* (2006.01)

(58) Field of Classification Search
USPC ........................................................ 254/93 R
See application file for complete search history.

(56) References Cited

U.S. PATENT DOCUMENTS

| | | | | |
|---|---|---|---|---|
| 6,199,379 | B1 * | 3/2001 | Hung | F15B 7/04 60/482 |
| 6,247,307 | B1 * | 6/2001 | Hung | B66F 3/42 60/479 |
| 6,347,786 | B1 * | 2/2002 | Lai | B66F 3/42 254/93 H |
| 7,421,841 | B2 * | 9/2008 | Yueh | B66F 5/04 254/93 H |
| 2009/0057633 | A1 | 3/2009 | Beck et al. | |

FOREIGN PATENT DOCUMENTS

| | | | |
|---|---|---|---|
| CN | 202508822 | U | 10/2012 |
| CN | 104228784 | A | 12/2014 |
| CN | 205133020 | U | 4/2016 |
| CN | 111017786 | A | 4/2020 |
| EP | 3000766 | A1 | 3/2016 |

OTHER PUBLICATIONS

Xu Changhong, "ISR for PCT Application PCT/CN2021/095857", Mar. 2, 2022, CNIPA, China.
Examiner, "Office Action for CN Application No. 202110573888.8", Jul. 5, 2022, CNIPA, China.
Ong Guoqin, "Office Action for CN Application No. 202110573889.2", Jul. 15, 2023, CNIPA, China.

* cited by examiner

HYDRAULIC OIL-CIRCUIT SYSTEM AND HYDRAULIC JACK

CROSS-REFERENCE TO RELATED APPLICATIONS

This application is based on and claims priority to Chinese Application No. 202110573889.2, No. 202110573888.8, No. 202121137294.4, and No. 202121140078.5, all filed on May 25, 2021, the entire contents of which are incorporated herein by reference for all purposes.

FIELD

This application relates to the field of mechanical equipment and, more particularly, to a hydraulic oil-circuit system and a hydraulic jack.

BACKGROUND

In hydraulic jacks of the related art, telescopic rods are driven to reciprocate through mutual transfer of liquid oil in two areas of the jacks, and a jacking function can be realized by a one-way valve and a cross-section difference. The hydraulic jacks generally lift weights simply by pressing a single piston downward, but due to the structural limitation, the weights can have a lifting stroke only when the piston is pressed downward. That is, there is no lifting stroke when the piston is pulled upward. At the same time, support blocks of the existing jacks are fixed, and if the weights are too far away from the support blocks, the jacks cannot support the weights, or most of the lifting stroke is wasted as an idle stroke.

Therefore, the existing hydraulic jacks have defects in terms of the structure and hydraulic oil-circuit system.

SUMMARY

A hydraulic oil-circuit system of a hydraulic jack includes: a hydraulic cylinder, a piston being arranged in the hydraulic cylinder and dividing an interior of the hydraulic cylinder into a first hydraulic oil chamber and a second hydraulic oil chamber, in which the first hydraulic oil chamber has a first oil port, and the second hydraulic oil chamber has a second oil port; an oil loading chamber in unidirectional communication with the first oil port and the second oil port, to allow unidirectional flow from the first oil port and the second oil port to the oil loading chamber; a storage oil chamber in unidirectional communication with the first oil port and the second oil port are both in unidirectional communication, to allow unidirectional flow from the storage oil chamber to the first oil port and the second oil port; an oil unloading pipeline connecting the oil loading chamber with the storage oil chamber. The hydraulic cylinder is a double-acting hydraulic cylinder, reciprocating motion of the piston changes volumes of the first hydraulic oil chamber and the second hydraulic oil chamber, and one of the first oil port and the second oil port delivers hydraulic oil to the oil loading chamber, while the other of the first oil port and the second oil port sucks oil from the storage oil chamber.

A hydraulic jack includes: an outer oil barrel, a handle being arranged on the outer oil barrel; an inner oil barrel, the outer oil barrel being fitted over the inner oil barrel and movable relative to the inner oil barrel, and the outer oil barrel and the inner oil barrel forming a storage oil chamber; a hydraulic cylinder arranged in the inner oil barrel and movable along an axial direction of the inner oil barrel in a sealing manner, in which an oil loading chamber and the storage oil chamber are formed at two ends of the hydraulic cylinder; a piston is arranged in the hydraulic cylinder and divides an interior of the hydraulic cylinder into a first hydraulic oil chamber and a second hydraulic oil chamber; the first hydraulic oil chamber has a first oil port, and the second hydraulic oil chamber has a second oil port; the first oil port and the second oil port are both in unidirectional communication with the oil loading chamber, to allow unidirectional flow from the first oil port and the second oil port to the oil loading chamber; the first oil port and the second oil port are both in unidirectional communication with the storage oil chamber, to allow unidirectional flow from the storage oil chamber to the first oil port and the second oil port; the hydraulic cylinder has an oil unloading pipeline connecting the oil loading chamber with the storage oil chamber; a piston rod having a first end connected to the piston and a second end connected to the handle, in which the handle drives the piston to reciprocate through the piston rod, to change volumes of the first hydraulic oil chamber and the second hydraulic oil chamber, and one of the first oil port and the second oil port delivers hydraulic oil to the oil loading chamber, while the other of the first oil port and the second oil port sucks oil from the storage oil chamber.

DETAILED DESCRIPTION OF EMBODIMENTS

Embodiments of the present disclosure are described in detail below, and examples of the described embodiments are shown in accompanying drawings. The following embodiments described with reference to the accompanying drawings are exemplary and are intended to explain the present disclosure rather than limit the present disclosure.

Figure 1:
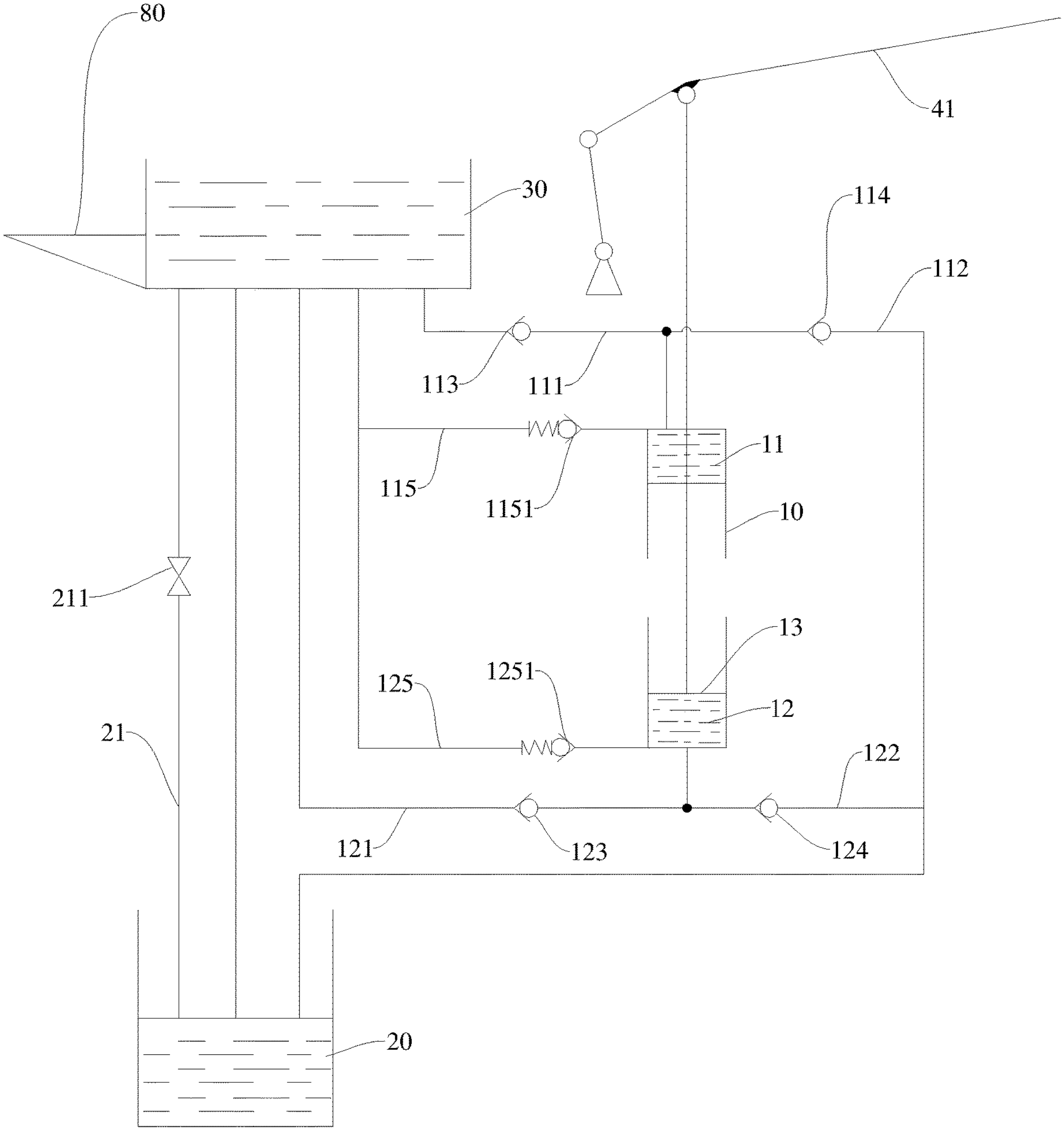
FIG. 1 is a schematic diagram of a hydraulic oil-circuit system according to embodiments of the present disclosure.

FIG. 1 shows a hydraulic oil-circuit system of a hydraulic jack according to some embodiments of the present disclosure. Depending on purposes and methods of use, the hydraulic jack can lift or pull a weight. The hydraulic oil-circuit system mainly includes: a hydraulic cylinder 10, an oil loading chamber 20, a storage oil chamber 30 and an oil unloading pipeline 21.

Specifically, a piston 13 is arranged in the hydraulic cylinder 10 and divides an interior of hydraulic cylinder 10 into a first hydraulic oil chamber 11 and a second hydraulic oil chamber 12. The first hydraulic oil chamber 11 has a first oil port, and the second hydraulic oil chamber 12 has a second oil port; the first oil port and the second oil port are both in unidirectional communication with the oil loading chamber 20, to allow unidirectional flow from the first oil port and the second oil port to the oil loading chamber 20; the first oil port and the second oil port are both in unidirectional communication with the storage oil chamber 30, to allow unidirectional flow from the storage oil chamber 30 to the first oil port and the second oil port.

In some embodiments, the hydraulic cylinder 10 is a double-acting hydraulic cylinder, that is, the first hydraulic oil chamber 11 and the second hydraulic oil chamber 12 are both working chambers. Thus, reciprocating motion of the piston 13 can change volumes of the first hydraulic oil chamber 11 and the second hydraulic oil chamber 12, so that one of the first oil port and the second oil port delivers hydraulic oil to the oil loading chamber 20, and the other thereof sucks oil from the storage oil chamber 30.

As shown in FIG. 1, when a handle 41 is pressed down, the second hydraulic oil chamber 12 is compressed, and the hydraulic oil is pressed into the oil loading chamber 20 through a fourth one-way valve 124, and a liquid level in the oil loading chamber 20 is raised. During this process, the volume of the first hydraulic oil chamber 11 increases, thus sucking the hydraulic oil from the storage oil chamber 30 through a first one-way valve 113. When the handle 41 is lifted up, the first hydraulic oil chamber 11 is compressed, so that the hydraulic oil in the first hydraulic oil chamber 11 is pressed into the oil loading chamber 20 through a second one-way valve 114, and the liquid level in the oil loading chamber 20 is raised. During this process, the volume of the second hydraulic oil chamber 12 increases, thus sucking the hydraulic oil from the storage oil chamber 30 through a third one-way valve 123.

Due to the design of the hydraulic cylinder 10 as the double-acting hydraulic cylinder and in combination with the control over the unidirectional flow of oil circuit, the liquid level in the oil loading chamber 20 can be raised regardless of pressing down or lifting up the handle 41, thus improving the working efficiency.

In some embodiments, a bearing assembly 80 for supporting the weight can be arranged outside the storage oil chamber 30 and fixed relative to the storage oil chamber 30. The bearing assembly 80 can be omitted, and an effect of supporting the weight can be realized directly by using an external structure of the storage oil chamber 30.

In the above embodiments, an oil unloading pipeline 21 is provided, and the oil unloading pipeline 21 connects the oil loading chamber 20 and the storage oil chamber 30. After the hydraulic oil-circuit system completes a lifting or pulling operation, the hydraulic oil in the oil loading chamber 20 can flow into the storage oil chamber 30 through the oil unloading pipeline 21. An unloading switch 211 is arranged at the oil unloading pipeline 21 and can control opening and closing of the oil unloading pipeline 21.

In some embodiments, the first oil port is in communication with the storage oil chamber 30 through a first oil inlet line 111 and is in communication with the oil loading chamber 20 through a first oil outlet line 112; the first one-way valve 113 is arranged at the first oil inlet line 111; and the second one-way valve 114 is arranged at the first oil outlet line 112. The second oil port is in communication with the storage oil chamber 30 through a second oil inlet line 121 and is in communication with the oil loading chamber 20 through a second oil outlet line 122; the third one-way valve 123 is arranged at the second oil inlet line 121; and the fourth one-way valve 124 is arranged at the second oil outlet line 122.

Thus, the unidirectional communication of the first oil port and the second oil port with the oil loading chamber 20 can be realized, and the unidirectional communication of the first oil port and the second oil port with the storage oil chamber 30 can be realized. Besides the embodiments, other embodiments can also realize the unidirectional communication of the first oil port and the second oil port with the oil loading chamber 20, and the unidirectional communication of the first oil port and the second oil port with the storage oil chamber 30.

In some embodiments, a first overload protection oil circuit 115 is connected between the first hydraulic oil chamber 11 and the storage oil chamber 30, and a second overload protection oil circuit 125 is connected between the second hydraulic oil chamber 12 and the storage oil chamber 30. When a pressure in the first hydraulic oil chamber 11 is greater than a first preset value, the first overload protection oil circuit 115 is opened to release the pressure to the storage oil chamber 30, avoiding damage to the hydraulic cylinder 10. Similarly, when a pressure in the second hydraulic oil chamber 12 is greater than a second preset value, the second overload protection oil circuit 125 is opened to release the pressure to the storage oil chamber 30, avoiding damage to the hydraulic cylinder 10.

Specifically, a first pressure one-way valve 1151 can be arranged at the first overload protection oil circuit 115, and a second pressure one-way valve 1251 can be arranged at the second overload protection oil circuit 125. The first pressure one-way valve 1151 and the second pressure one-way valve 1251 each can only be opened at a preset pressure, and the first preset value and the second preset value can be the same or different.

Referring to FIGS. 2-5, embodiments of the present disclosure provide a hydraulic jack that includes: an outer oil barrel 40, an inner oil barrel 50, a hydraulic cylinder 10, and a piston rod 60.

Specifically, a handle 41 is arranged on the outer oil barrel 40; the outer oil barrel 40 is fitted over the inner oil barrel 50 and can move relative to the inner oil barrel 50; the outer oil barrel 40 and the inner oil barrel 50 form a storage oil chamber 30; the storage oil chamber 30 may be located inside the inner oil barrel 50, or may be located between the outer oil barrel 40 and the inner oil barrel 50, or may be located inside the inner oil barrel 50 and between the outer oil barrel 40 and the inner oil barrel 50.

The hydraulic cylinder 10 is arranged in the inner oil barrel 50 and can move along an axial direction of the inner oil barrel 50 in a sealing manner. An oil loading chamber 20 and a storage oil chamber 30 are located at two ends of the hydraulic cylinder 10. A piston 13 is arranged within hydraulic cylinder 10 and divides an interior of the hydraulic cylinder 10 into a first hydraulic oil chamber 11 and a second hydraulic oil chamber 12. The first hydraulic oil chamber 11 has a first oil port, and the second hydraulic oil chamber 12 has a second oil port. The first oil port and the second oil port are both in unidirectional communication with the oil loading chamber 20, to allow unidirectional flow from the first oil port and the second oil port to the oil loading chamber 20. The first oil port and the second oil port are both in unidirectional communication with the storage oil chamber 30, to allow unidirectional flow from the storage oil chamber 30 to the first oil port and the second oil port. The hydraulic cylinder 10 has an oil unloading pipeline 21 that connects the oil loading chamber 20 and the storage oil chamber 30.

A first end of the piston rod 60 is connected to the piston 13 and a second end of the piston rod 60 is connected to the handle 41, so that the handle 41 can drive the piston 13 to reciprocate through the piston rod 60, to change volumes of the first hydraulic oil chamber 11 and the second hydraulic oil chamber 12. As a result, one of the first oil port and the second oil port delivers hydraulic oil to the oil loading chamber 20, and the other thereof sucks oil from the storage oil chamber 30.

In the above embodiments, the piston rod 60 also plays a supporting role. When the hydraulic oil in the oil loading chamber 20 increases, the hydraulic cylinder 10 is pushed to move upward, and a support force is transmitted to the handle 41 through the piston rod 60 and further to the outer oil barrel 40, so that the hydraulic cylinder 10, the outer oil barrel 40 and the piston rod 60 move upward synchronously relative to the inner oil barrel 50, realizing a jacking or pulling function.

In some embodiments, the outer oil barrel 40 is provided with an oil barrel cover 42, and the oil barrel cover 42 is arranged in a sealing manner at a top of the outer oil barrel 40. The handle 41 is hinged to the oil barrel cover 42, and the piston rod 60 passes through the oil barrel cover 42 and is hinged with the handle 41. That is, the top of the outer oil barrel 40 in the embodiments is sealed by the oil barrel cover 42, and meanwhile the oil barrel cover 42 is also used to mount the handle 41.

Figure 3:
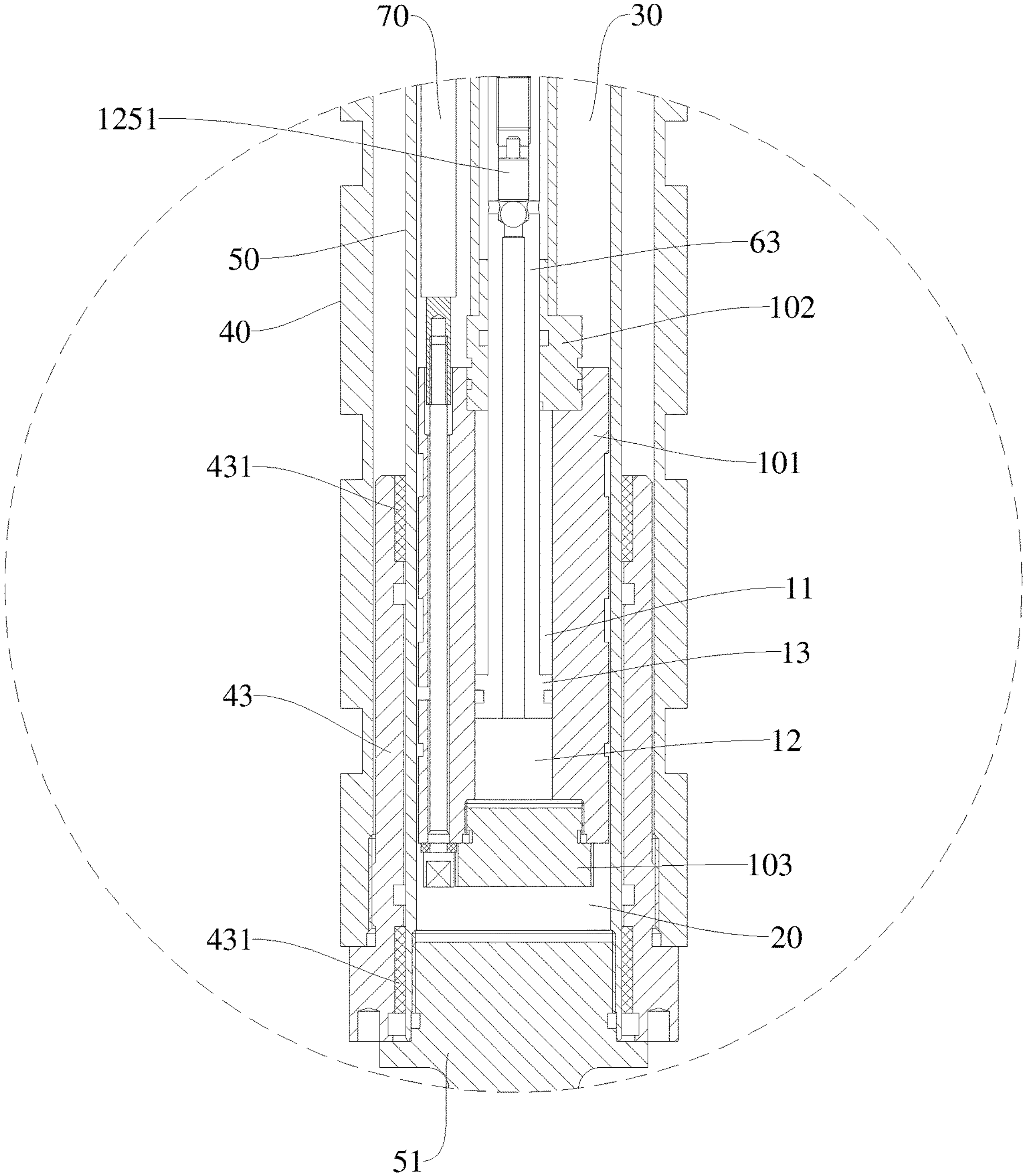
FIG. 3 is a partially enlarged view of part A in FIG. 2.
Figure 4:
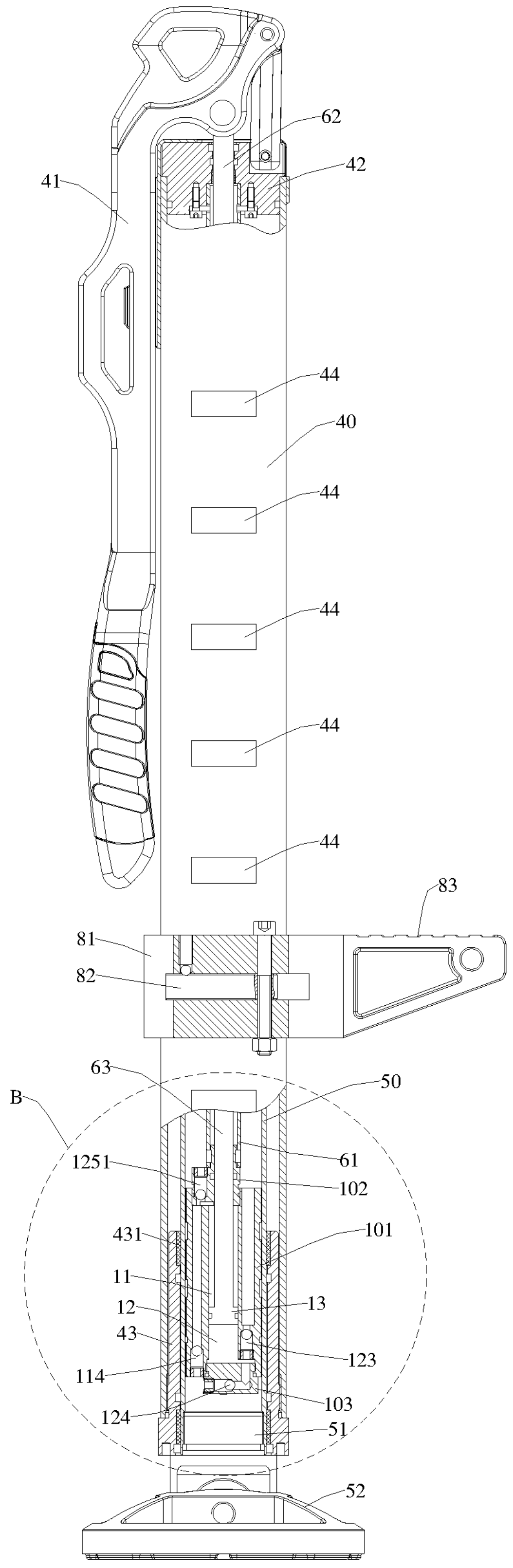
FIG. 4 is a partial sectional view of a hydraulic jack in a second section plane according to embodiments of the present disclosure.
Figure 5:
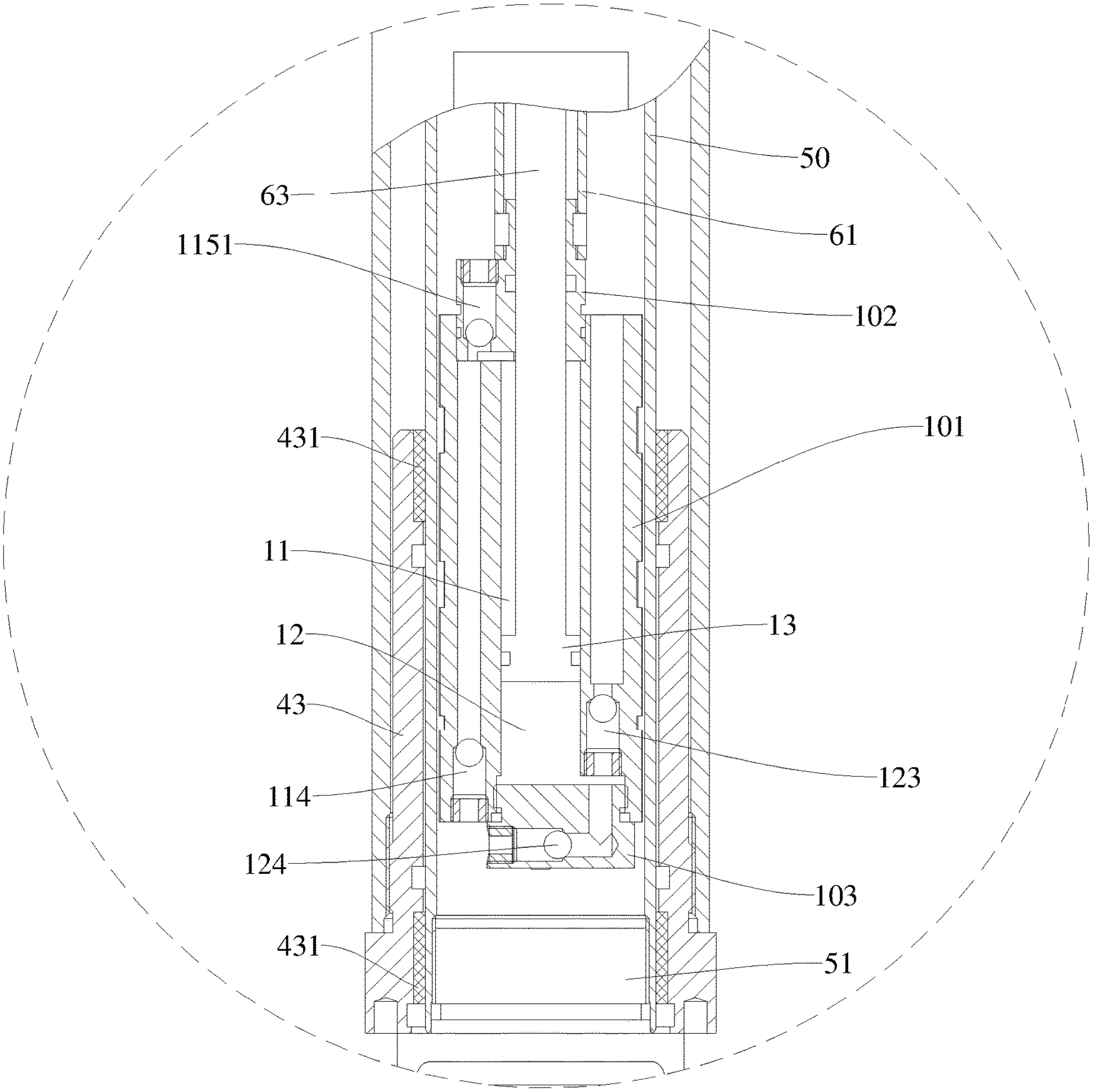
FIG. 5 is a partially enlarged view of part B in FIG. 4.
Figure 6:
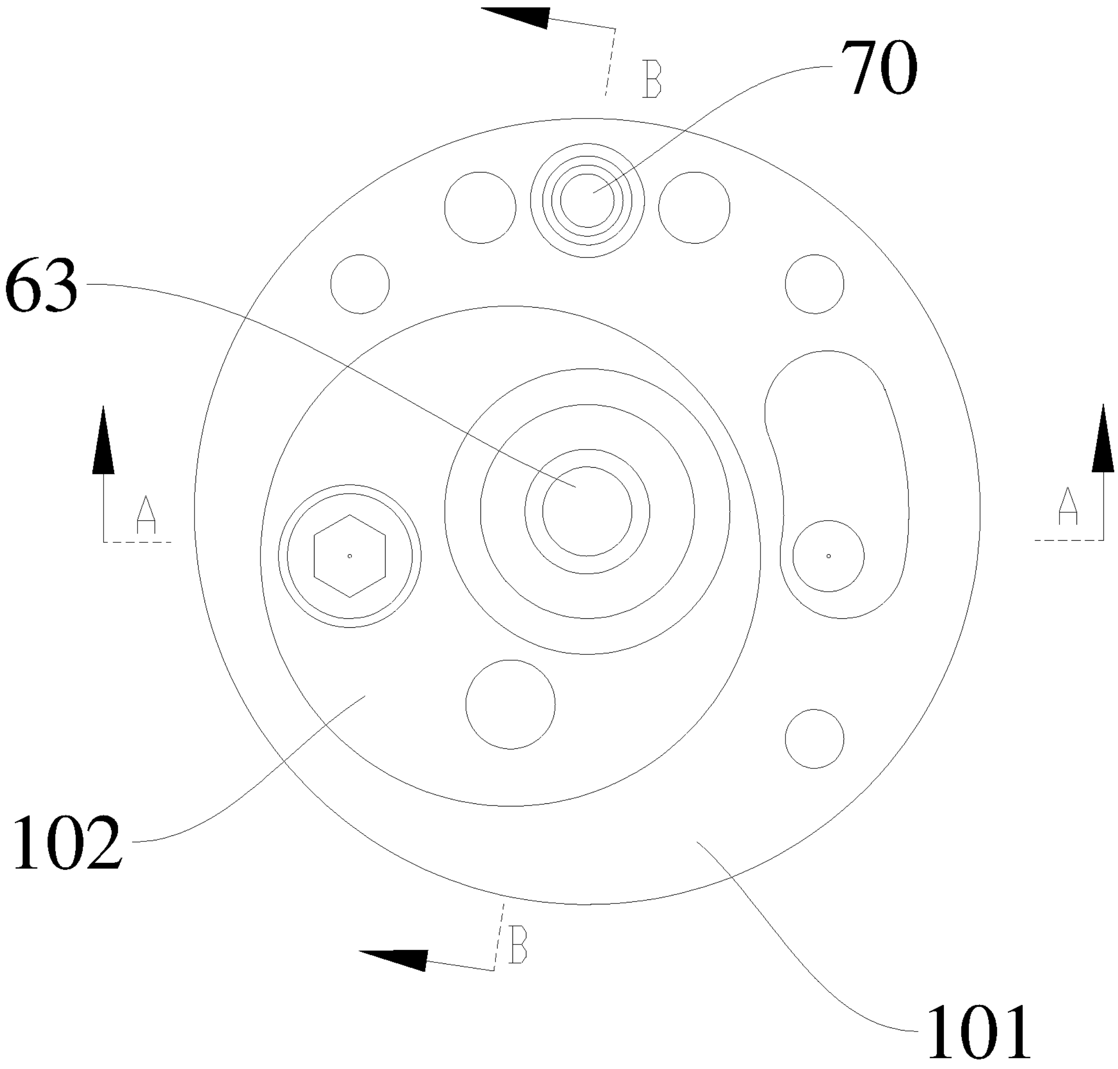
FIG. 6 is a top view illustrating the assembly of a hydraulic cylinder, a piston rod and other components according to embodiments of the present disclosure.

Referring to FIG. 3 and FIG. 5, the outer oil barrel 40 is provided with a sleeve 43, and the sleeve 43 is fixedly connected to a bottom of the outer oil barrel 40. The sleeve 43 is fitted over the inner oil barrel 50 and can slide along an outer wall of the inner oil barrel 50 in a sealing manner. In some embodiments, the sleeve 43 can play a sealing role at the bottom of the outer oil barrel 40, and play a guiding role to ensure coaxiality of the outer oil barrel 40 and the inner oil barrel 50 and avoid skew during a rising process of the outer oil barrel 40.

In some embodiments, a shaft sleeve 431 is arranged on at least part of an inner wall of the sleeve 43. The shaft sleeve 431 is arranged coaxially with the sleeve 43 and fixed relative to the sleeve 43. The sleeve 43 is fitted over the outer wall of the inner oil barrel 50, and can move axially relative to the inner oil barrel 50. In some embodiments, the shaft sleeve 431 also plays a guiding role, and a plurality of shaft sleeves 431 can be arranged. As shown in FIG. 3, one shaft sleeve 431 is arranged at each of an upper end and a lower end of the sleeve 43.

In some embodiments, a base sealing body 51 is arranged at a bottom of the inner oil barrel 50 and the base sealing body 51 seals the bottom of the inner oil barrel 50; a top of the inner oil barrel 50 is located below the oil barrel cover 42 and is open in an inner chamber of the outer oil barrel 40. As a result, an inner chamber of the inner oil barrel 50 is in communication with the inner chamber of the outer oil barrel 40, and the storage oil chamber 30 is formed in the inner chamber of the inner oil barrel 50 and the inner chamber of the outer oil barrel 40. Instead of the arrangement of the base sealing body 51 at the bottom of the inner oil barrel 50, the bottom of the inner oil barrel 50 can be directly designed as a sealed structure, that is, the inner oil barrel 50 can be a barrel with only one upper opening. When the inner oil barrel 50 is designed to have upper and lower openings, the base sealing body 51 is arranged at the bottom of the inner oil barrel 50 to seal it.

In some embodiments, the base sealing body 51 can also be used as a support foundation of the hydraulic jack, and designed with a larger support surface. A base 52 can also be specially designed. For example, the base sealing body 51 is connected to the base 52, and the base 52 is detachably connected to the base sealing body 51. The base 52 can also be removed when necessary.

Figure 2:
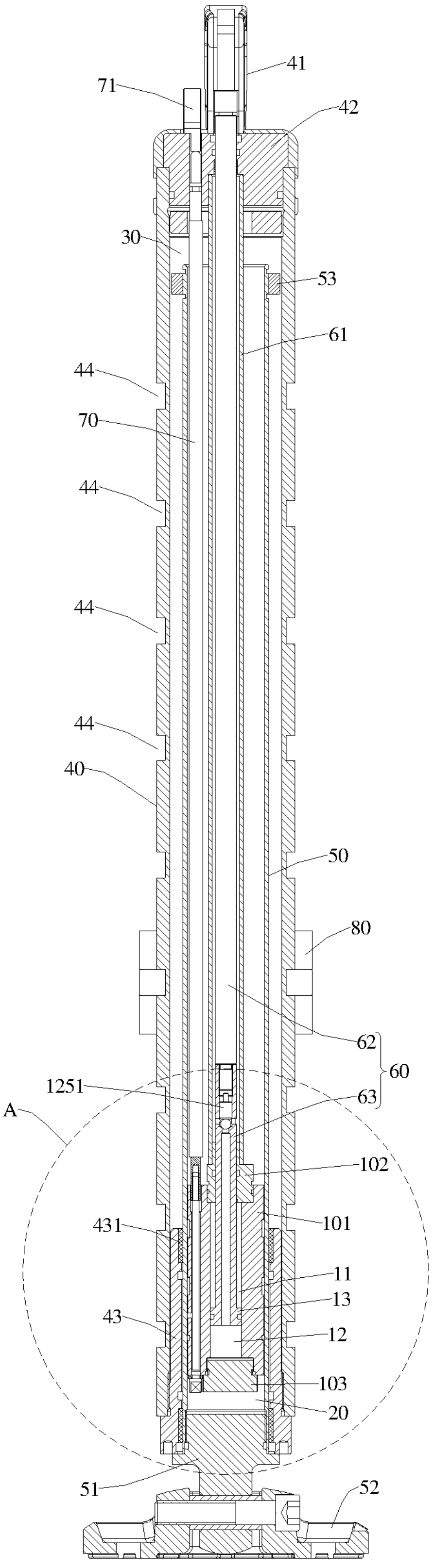
FIG. 2 is a sectional view of a hydraulic jack in a first section plane according to embodiments of the present disclosure.

In some embodiments, referring to FIG. 2, a limiting member 53 is arranged on the outer wall of the inner oil barrel 50 and used to limit a motion range of the outer oil barrel 40; the limiting member 53 is located at a position above a middle part of the inner oil barrel 50 and fixed relative to the inner oil barrel 50.

Referring to FIG. 3 and FIGS. 5-8, in some embodiments, the hydraulic cylinder 10 mainly includes: an oil-circuit main body 101, an oil-circuit upper cover 102, and an oil-circuit lower cover 103. An outer wall of the oil-circuit main body 101 is in sealing contact with an inner wall of the inner oil barrel 50, and the oil-circuit main body 101 can move axially relative to the inner oil barrel 50. A hydraulic oil chamber running through the oil-circuit main body 101 is formed in the oil-circuit main body 101, and the piston 13 is arranged in the hydraulic oil chamber and divides the hydraulic oil chamber into the first hydraulic oil chamber 11 and the second hydraulic oil chamber 12. The oil-circuit upper cover 102 seals an upper end of the hydraulic oil chamber, and the oil-circuit lower cover 103 seals a lower end of the hydraulic oil chamber. The piston rod 60 passes through the oil-circuit upper cover 102 and is connected to the piston 13. The oil unloading pipeline 21 is formed in the oil-circuit main body 101. A hydraulic principle of the hydraulic jack according to the embodiments can refer to FIG. 1 and the description about the hydraulic oil-circuit system in the above embodiments.

Figure 7:
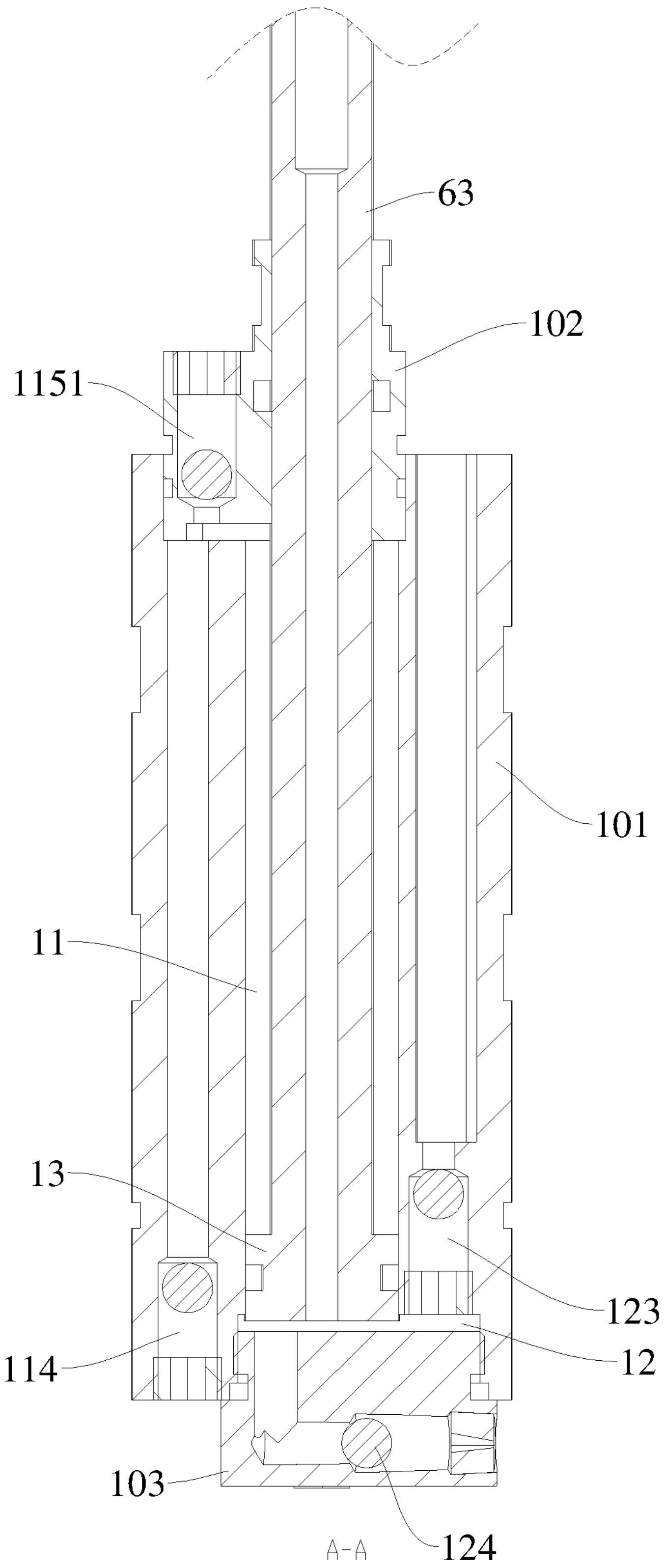
FIG. 7 is a sectional view along A-A of FIG. 6.
Figure 8:
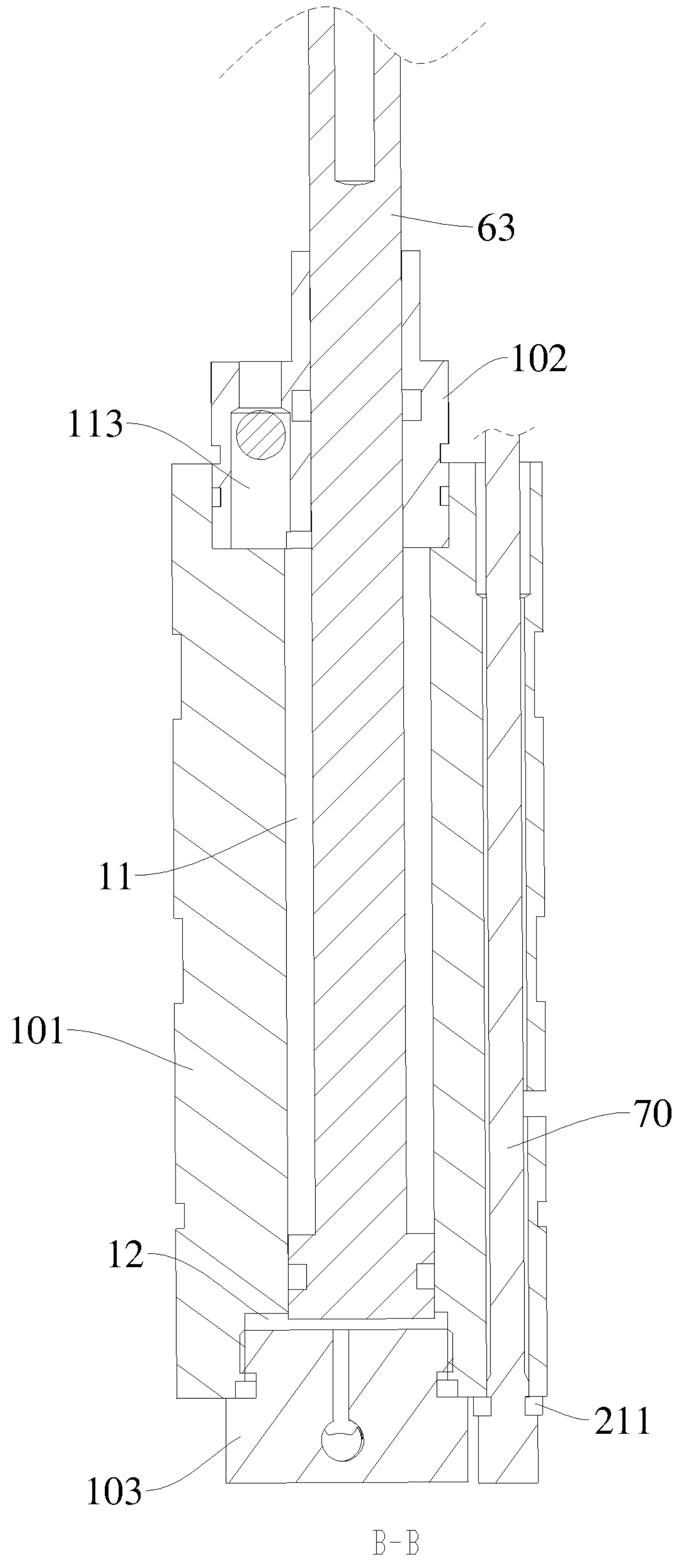
FIG. 8 is a sectional view along B-B of FIG. 6.

In some embodiments, referring to FIGS. 7-8, the first oil port is in communication with the storage oil chamber 30 through the first oil inlet line 111 and is in communication with the oil loading chamber 20 through the first oil outlet line 112, the first one-way valve 113 is arranged at the first oil inlet line 111, and the second one-way valve 114 is arranged at the first oil outlet line 112; the second oil port is in communication with the storage oil chamber 30 through the second oil inlet line 121 and is in communication with the oil loading chamber 20 through the second oil outlet line 122, the third one-way valve 123 is arranged at the second oil inlet line 121, and the fourth one-way valve 124 is arranged at the second oil outlet line 122.

In some embodiments, the first oil inlet line 111 is formed in the oil-circuit upper cover 102, the first oil outlet line 112 and the second oil inlet line 121 are both formed in the oil-circuit main body 101, and the second oil outlet line 122 is formed in the oil-circuit lower cover 103.

Figure 9:
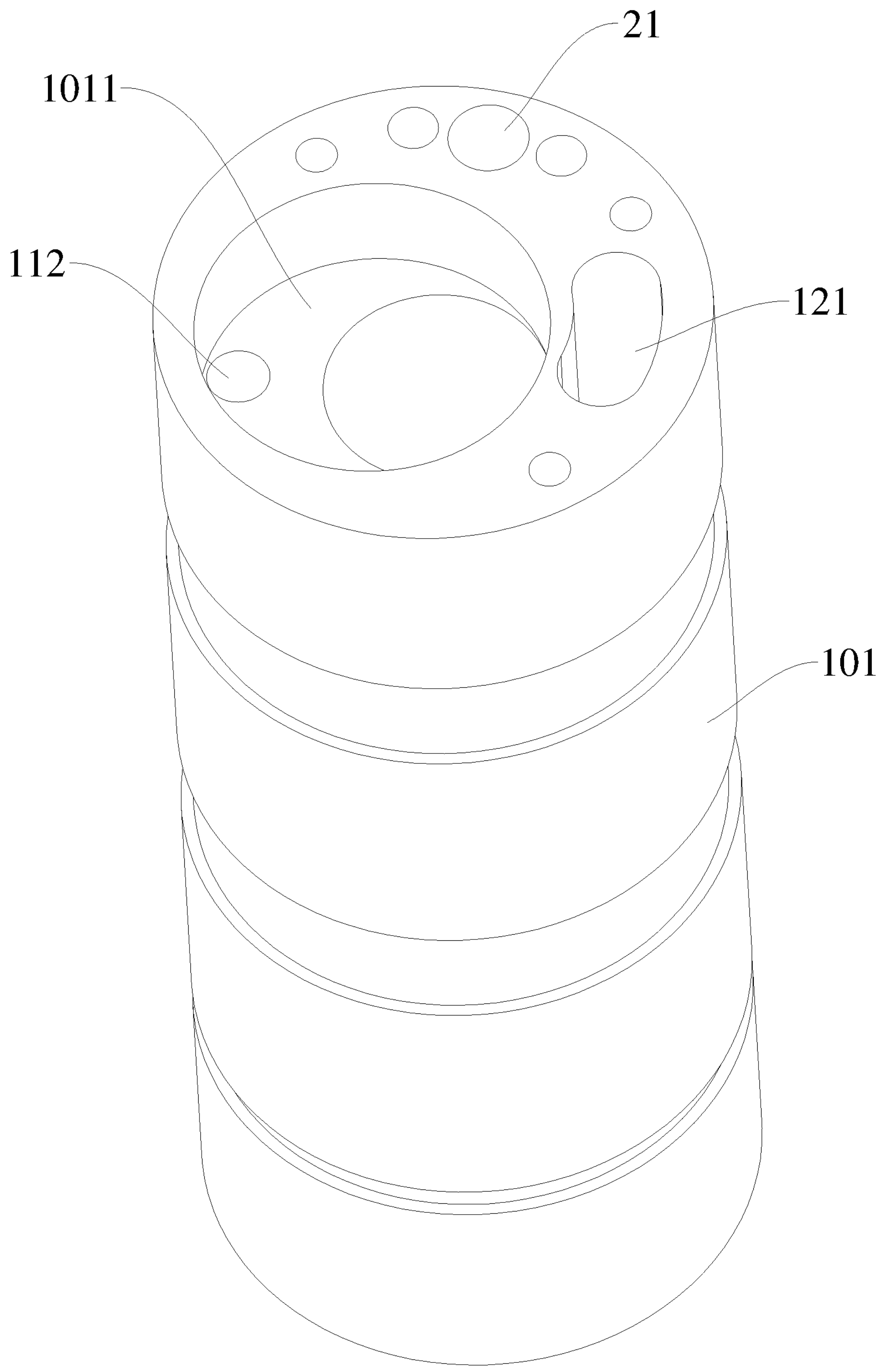
FIG. 9 and FIG. 10 are perspective views of an oil-circuit main body arranged at different angles according to embodiments of the present disclosure.
Figure 10:
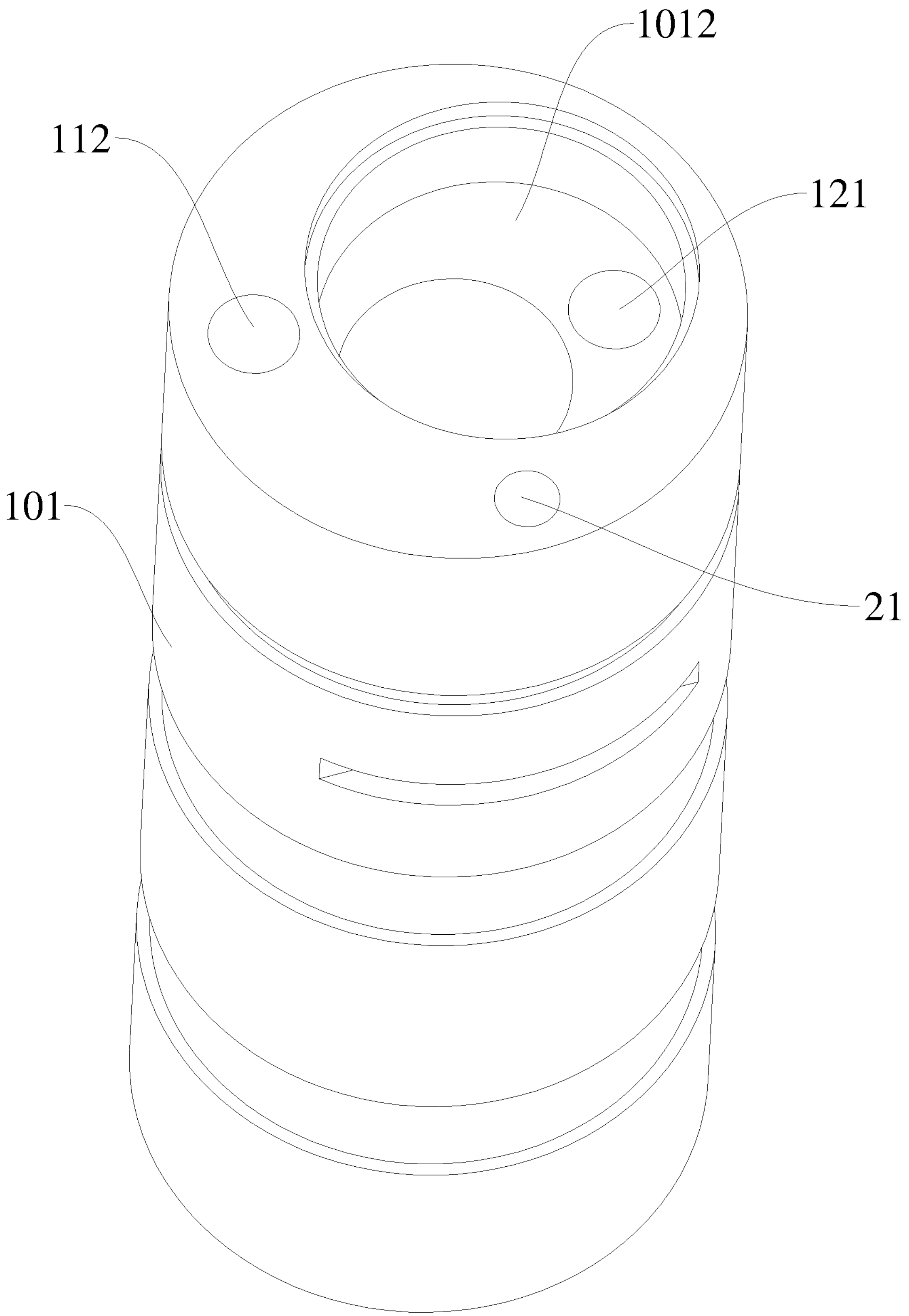
Figure 11:
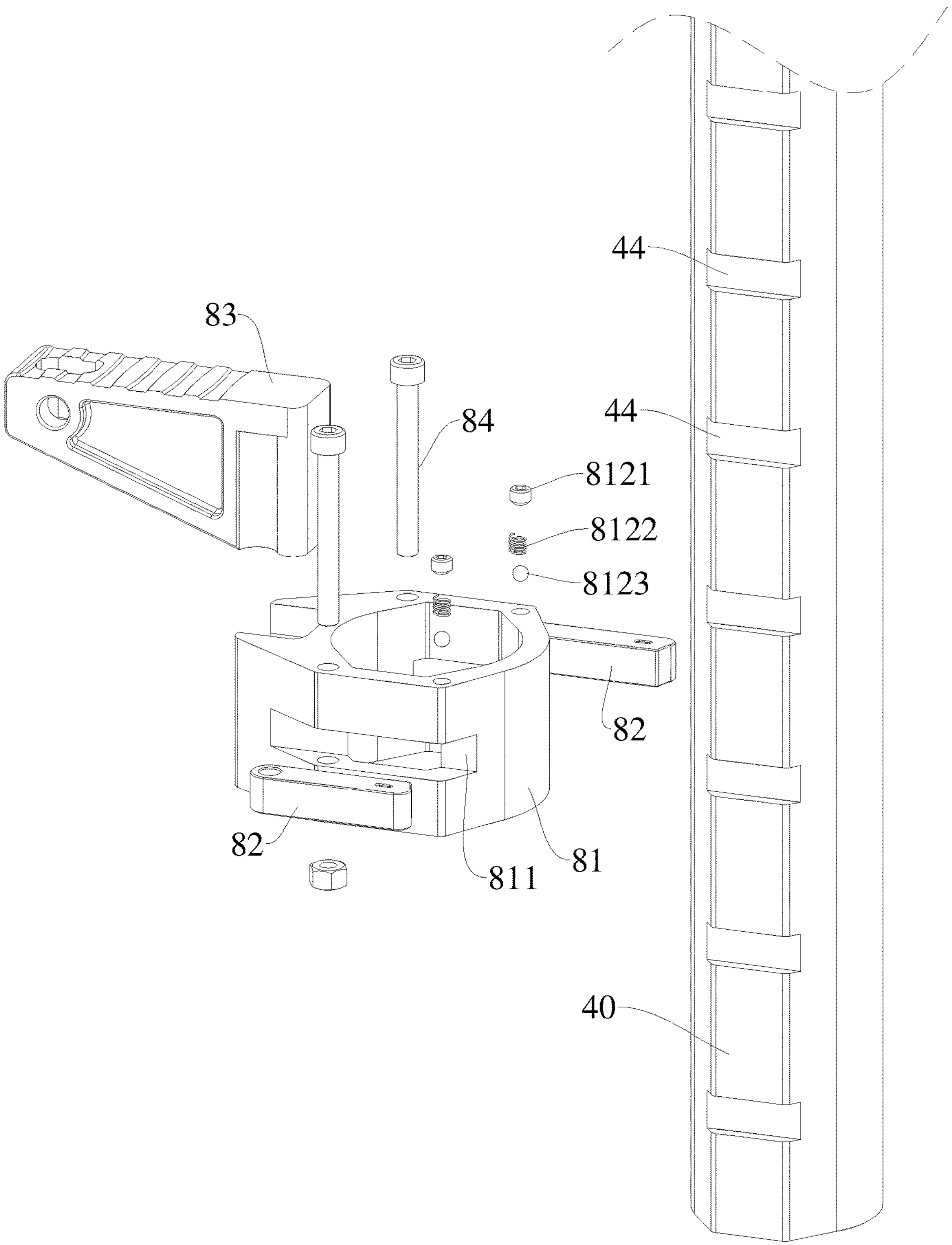
FIG. 11 is an exploded view of a bearing assembly mounted on an outer oil barrel according to embodiments of the present disclosure.

In some embodiments, referring to FIG. 9 and FIG. 10, a first sink 1011 is formed at an upper end of the oil-circuit main body 101, and a second sink 1012 is formed at a lower end of the oil-circuit main body 101. At least a partial structure of the oil-circuit upper cover 102 is arranged in the first sink 1011, and at least a partial structure of the oil-circuit lower cover 103 is arranged in the second sink 1012. An inlet of the first oil outlet line 112 is located in the first sink 1011, and an outlet of the second oil inlet line 121 is located in the second sink 1012.

Referring to FIG. 7 and FIG. 8, a certain gap can be formed between a top of the oil-circuit lower cover 103 and a bottom of the second sink 1012, so that the hydraulic oil at the outlet of the second oil inlet line 121 can flow into the second hydraulic oil chamber 12 quickly. If there is no gap, a channel groove can be arranged at the top of the oil-circuit lower cover 103. Similarly, a certain gap can be formed between a bottom of the oil-circuit upper cover 102 and a bottom of the first sink 1011, so that the hydraulic oil in the first hydraulic oil chamber 11 can enter the inlet of the first oil outlet line 112. If there is no gap, a channel groove can be arranged at the bottom of the oil-circuit upper cover 102.

In some embodiments, referring to FIG. 2 and FIG. 8, an oil unloading rod 70 is arranged in the inner oil barrel 50. A first end of the oil unloading rod 70 is arranged at the oil unloading pipeline 21, and a second end of the oil unloading rod 70 passes through the oil barrel cover 42 and is connected to an oil unloading handle 71. The oil unloading handle 71 is hinged to the oil barrel cover 42, and the communication and closing of the oil unloading pipeline 21 can be controlled by the oil unloading rod 70. Specifically, the oil unloading rod 70 can be provided with a reset spring (not shown in the drawings). When the oil unloading rod 70 is pressed down, a bottom of the oil unloading pipeline 21 is opened, thus connecting the storage oil chamber 30 and the oil loading chamber 20, and realizing oil unloading and pressure release of the oil loading chamber 20. When a pressing action on the oil unloading rod 70 is stopped, the oil unloading rod 70 automatically closes the oil unloading pipeline 21 under the action of the reset spring.

In some embodiments, a first overload protection oil circuit 115 is connected between the first hydraulic oil chamber 11 and the storage oil chamber 30, and a second overload protection oil circuit 125 is connected between the second hydraulic oil chamber 12 and the storage oil chamber 30. When a pressure in the first hydraulic oil chamber 11 is greater than a first preset value, the first overload protection oil circuit 115 is opened to release the pressure to the storage oil chamber 30, avoiding damage to the hydraulic cylinder 10.

Similarly, when a pressure in the second hydraulic oil chamber 12 is greater than a second preset value, the second overload protection oil circuit 125 is opened to release the pressure to the storage oil chamber 30, avoiding damage to the hydraulic cylinder 10. Specifically, a first pressure one-way valve 1151 can be arranged at the first overload protection oil circuit 115, and a second pressure one-way valve 1251 can be arranged at the second overload protection oil circuit 125. The first pressure one-way valve 1151 and the second pressure one-way valve 1251 each can only be opened at a preset pressure, and the first preset value and the second preset value can be the same or different.

In some embodiments, the first overload protection oil circuit 115 is arranged at the oil-circuit upper cover 102, and the second overload protection oil circuit 125 is arranged at the piston rod 60. At least part of the piston rod 60 has a hollow structure, and a bottom end of the piston 13 has an opening, so that the hydraulic oil in the second hydraulic oil chamber 12 can flow into the hollow piston rod 60 through the opening, and then flow to a position of the second pressure one-way valve 1251. An outlet of the second pressure one-way valve 1251 is arranged to be communicated with the storage oil chamber 30.

In some embodiments, the first pressure one-way valve 1151 is arranged at the first overload protection oil circuit 115, and the second pressure one-way valve 1251 is arranged at the second overload protection oil circuit 125. The first pressure one-way valve 1151 is opened when a pressure difference on both sides of the first pressure one-way valve 1151 is greater than a first preset value, and the second pressure one-way valve 1251 is opened when a pressure difference on both sides of the second pressure one-way valve 1251 is greater than a second preset value. An opening pressure value for the first pressure one-way valve 1151 and an opening pressure value for the second pressure one-way valve 1251 can be the same or different.

In some embodiments, a piston barrel 61 is fitted over the piston rod 60, one end of the piston barrel 61 is connected to the oil barrel cover 42, and the other end of the piston barrel 61 is connected to the hydraulic cylinder 10. The piston barrel 61 plays a supporting role between the hydraulic cylinder 10 and the oil barrel cove 42. The hydraulic cylinder 10 moving upward transmits a support force to the oil barrel cover 42 through the piston barrel 61. When the piston barrel 61 supports the oil barrel cover 42, the support force of the piston rod 60 on the oil barrel cover 42 decreases or the piston rod 60 has no support force on the oil barrel cover 42. This arrangement can reduce damage to the piston rod 60 and improve the service life of the hydraulic jack.

In some embodiments, the piston rod 60 includes an upper piston rod 62 and a lower piston rod 63 connected with each other, the upper piston rod 62 is connected to the handle 41, and the lower piston rod 63 is connected to the piston 13. The lower piston rod 63 has a hollow structure, and the second pressure one-way valve 1251 is arranged in the lower piston rod 63. One or more through holes can be arranged in the piston barrel 61 to connect the hydraulic oil in the piston barrel 61 with the storage oil chamber 30.

In some embodiments, referring to FIGS. 11-15, a bearing assembly 80 is arranged on an outer wall of the outer oil barrel 40, the outer wall of the outer oil barrel 40 has a plurality of fixing positions, and the bearing assembly 80 can be fixed at any fixing position and can move between any two fixing positions. During use of the hydraulic jack, if the position of the bearing assembly 80 is far from a lifting surface, the fixing position of the bearing assembly 80 can be first adjusted, and hence the bearing assembly 80 is fixed at a nearest position from the lifting surface. Then, a lifting operation is carried out, and the invalid stroke can be reduced.

Figure 14:
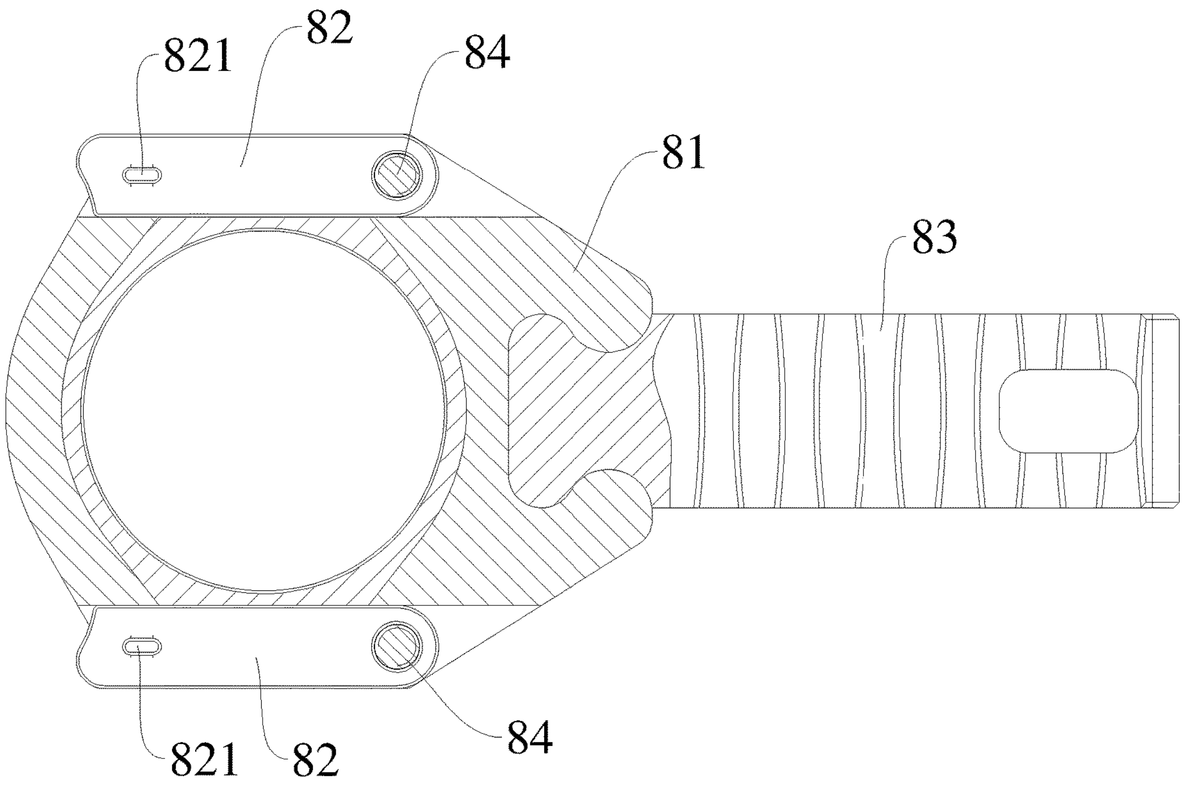
FIG. 14 and FIG. 15 are sectional views of a bearing assembly mounted on an outer oil barrel according to embodiments of the present disclosure, in which pins are located in different positions.
Figure 15:
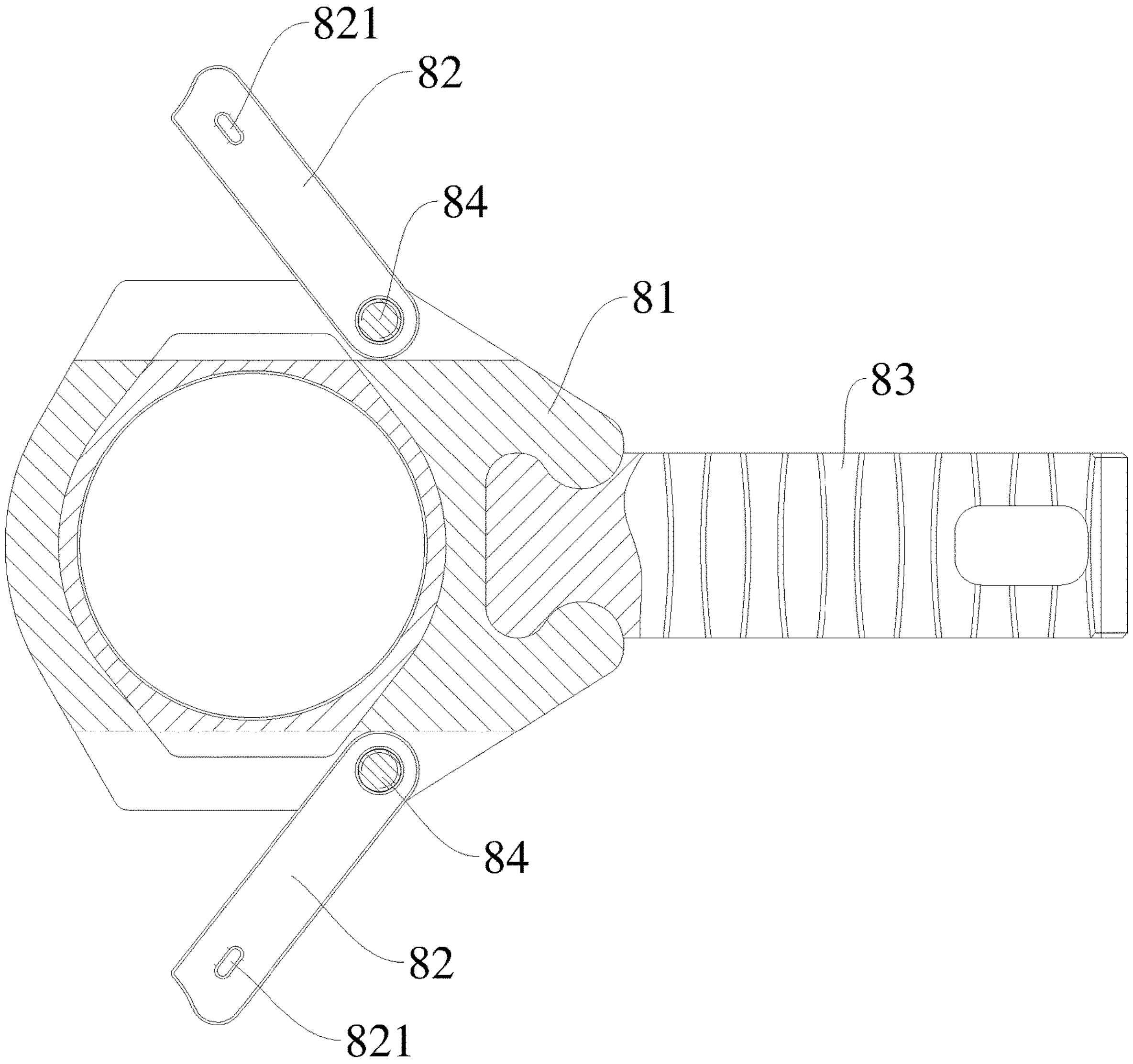

Specifically, a snap groove 44 is arranged in each of the fixing positions. The bearing assembly 80 includes: a sliding block 81, a pin 82 and a jacking block 83; the sliding block 81 is fitted over the outer wall of the outer oil barrel 40 and can move relative to the outer oil barrel 40. A pin mounting groove 811 is arranged in the sliding block 81, and one end of the pin 82 is hinged to the pin mounting groove 811 through a hinge shaft 84. The pin 82 has an opening state (as shown in FIG. 15) and a locking state (as shown in FIG. 14), and can switch between the opening state and the locking state; in the opening state, the sliding block 81 can move relative to the outer oil barrel 40.

In the locking state, the pin 82 has a partial structure located in the pin mounting groove 811 and a partial structure located in the snap groove 44, so that the sliding block 81 is fixed relative to the outer oil barrel 40.

In some embodiments, in the locking state, the pin 82 pivots into the pin mounting groove 811; in the opening state, the one end of the pin 82 pivots out of the pin mounting groove 811.

In some embodiments, the jacking block 83 is mounted on the sliding block 81 and can move synchronously with the sliding block 81. The jacking block 83 is detachably connected to the sliding block 81. The specific connection mode can be insertion, snap connection, mortise-tenon connection, or threaded connection.

Figure 16:
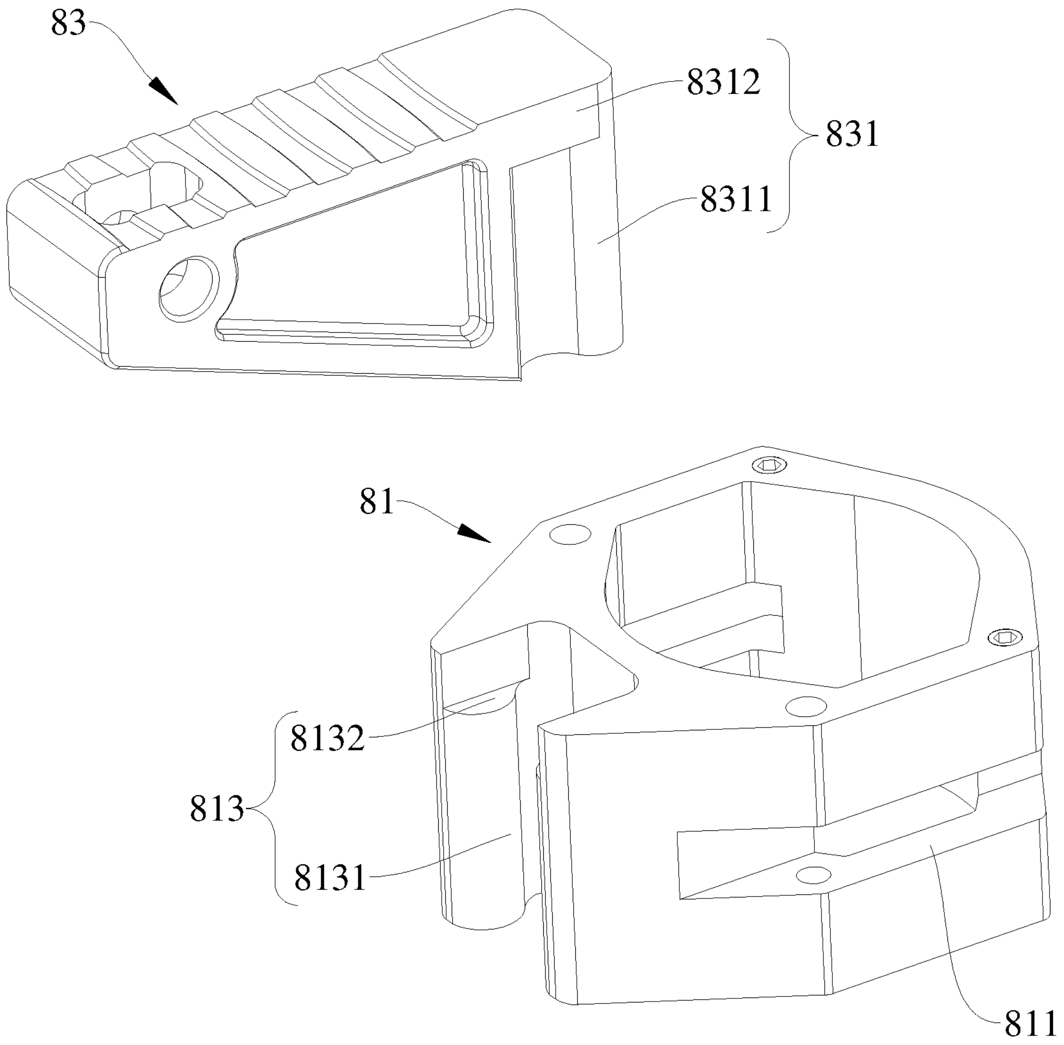
FIG. 16 is a perspective view of a sliding block and a jacking block according to embodiments of the present disclosure.

Referring to FIG. 16, an insertion groove 813 is arranged in the sliding block 81, and the insertion groove 813 includes a first guide portion 8131 and a limiting portion 8132. The jacking block 83 has an insertion portion 831, and the insertion portion 831 includes a second guide portion 8311 and a limiting block 8312. The insertion portion 831 can be inserted in the insertion groove 813, the second guide portion 8311 cooperates with the first guide portion 8131, and the limiting block 8312 cooperates with the limiting portion 8132. This insertion structure enables quick connection and quick detachment of the sliding block 81 and the jacking block 83, and enjoys high stability of connection. Cooperating surfaces of the first guide portion 8131 and the second guide portion 8311 are curved surfaces.

Figure 12:
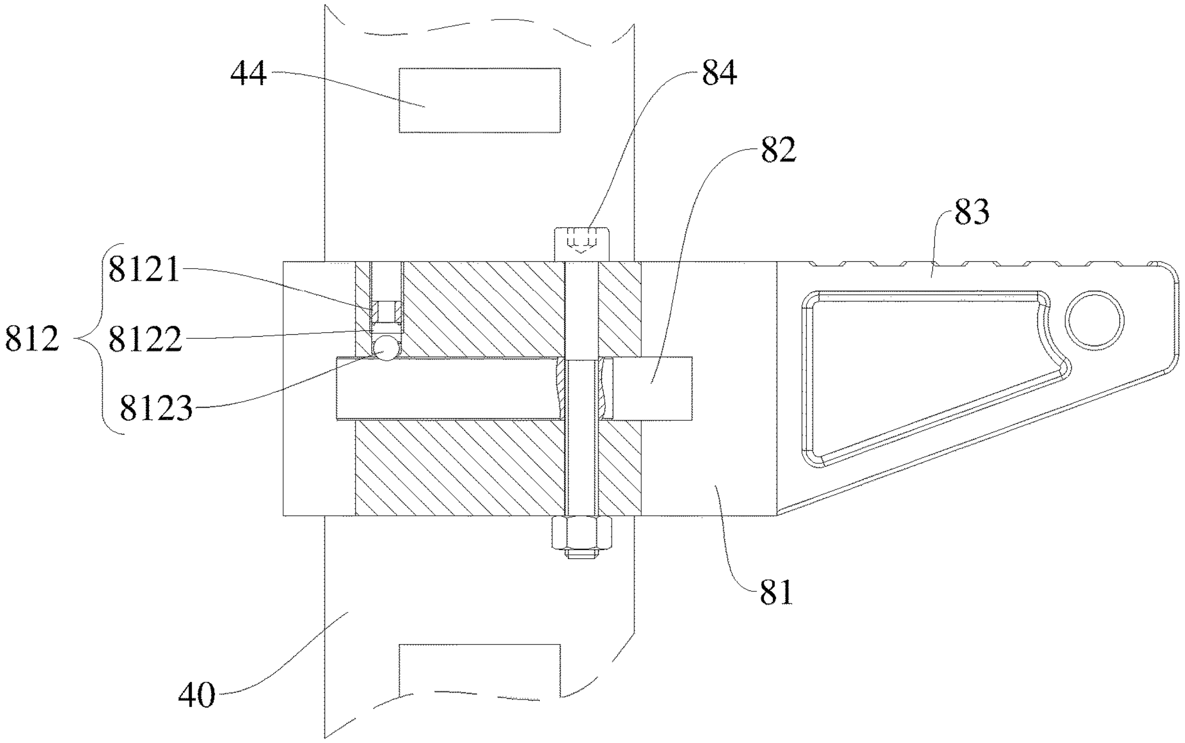
FIG. 12 and FIG. 13 are sectional views of a bearing assembly mounted on an outer oil barrel according to embodiments of the present disclosure.
Figure 13:
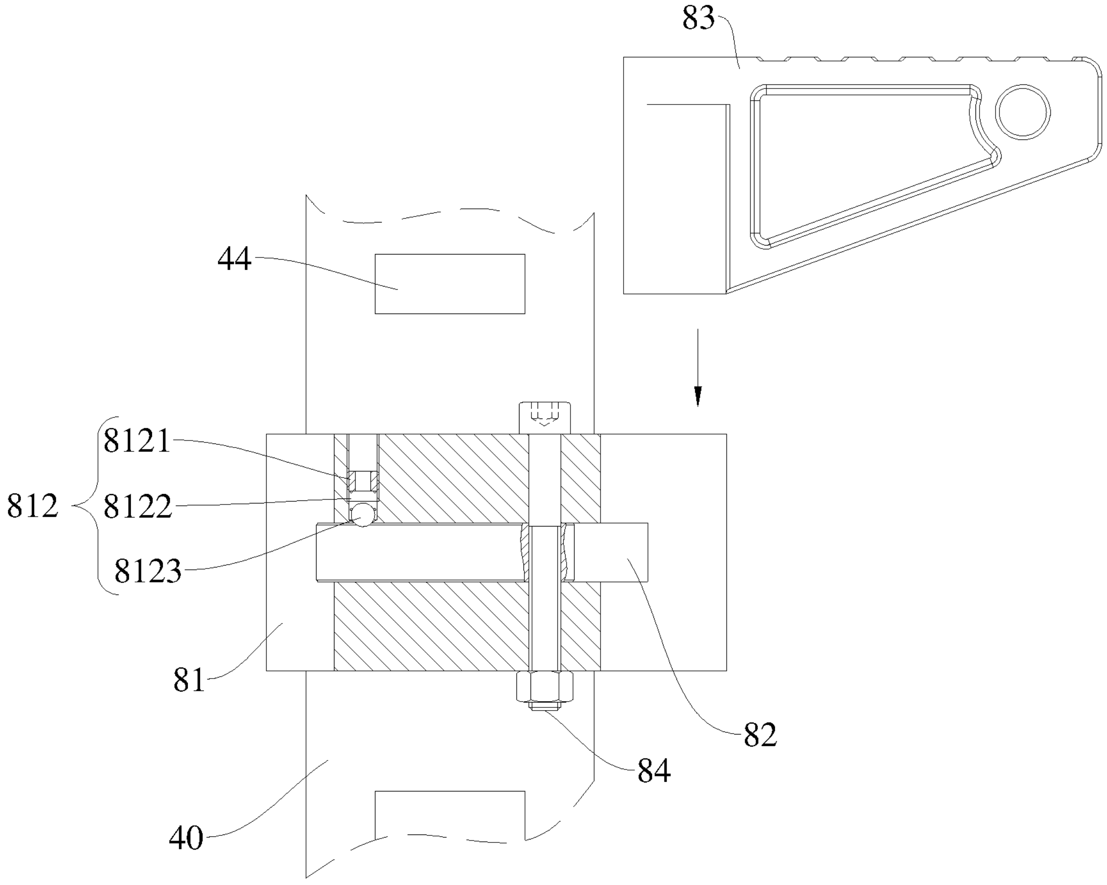

In some embodiments, an elastic pushing assembly 812 is arranged on the sliding block 81, and a groove 821 is arranged on the pin 82. When the pin 82 is in the locking state, the elastic pushing assembly 812 abuts against the groove 821. As shown in FIG. 12 and FIG. 13, the elastic pushing assembly 812 is pushed into the groove 821 to limit rotation of the pin 82. The limitation of the elastic pushing assembly 812 on the pin 82 can prevent the pin 82 from rotating arbitrarily. By applying a certain external force to the pin 82, the groove 821 can get rid of the limitation of the elastic pushing assembly 812, and thus the locking state is switched to the opening state.

In some embodiments, the elastic pushing assembly 812 includes a screw 8121, a spring 8122 and a push bead 8123. The sliding block 81 is provided with a mounting through hole; and the screw 8121, the spring 8122, and the push bead 8123 are arranged in the mounting through hole. The spring 8122 is compressed between the screw 8121 and the push bead 8123, and a part of the push bead 8123 can be exposed from an end of the mounting through hole to abut against the groove 821. As shown in FIG. 14, the pin 82 is located in the pin mounting groove 811, and the position of the sliding block 81 is fixed. As shown in FIG. 15, the one end of the pin 82 pivots out of the pin mounting groove 811, and the position of the sliding block 81 can be adjusted up and down.

As shown in FIG. 13, the jacking block 83 is detachably connected with the sliding block 81. The structure of the jacking block 83 can be in many forms. Anti-skid stripes are arranged on a lifting surface of the jacking block 83. The lifting surface of the jacking block 83 may be perpendicular to a lifting direction of the outer oil barrel 40 (i.e., a horizontal arrangement shown in FIG. 13) or may be arranged as an inclined surface for use in a special working environment. Therefore, the detachable connection between the jacking block 83 and the sliding block 81 can facilitate replacement of different types of jacking blocks 83.

In some embodiments, two pins 82 are provided, two pin mounting grooves 811 are arranged in the sliding block 81, and one pin 82 is hinged to each of the pin mounting grooves 811; the two pins 82 are symmetrical about a center axis of the outer oil barrel 40. This arrangement can make the connection between the sliding block 81 and the outer oil barrel 40 firmer and more stable.

Figure 17:
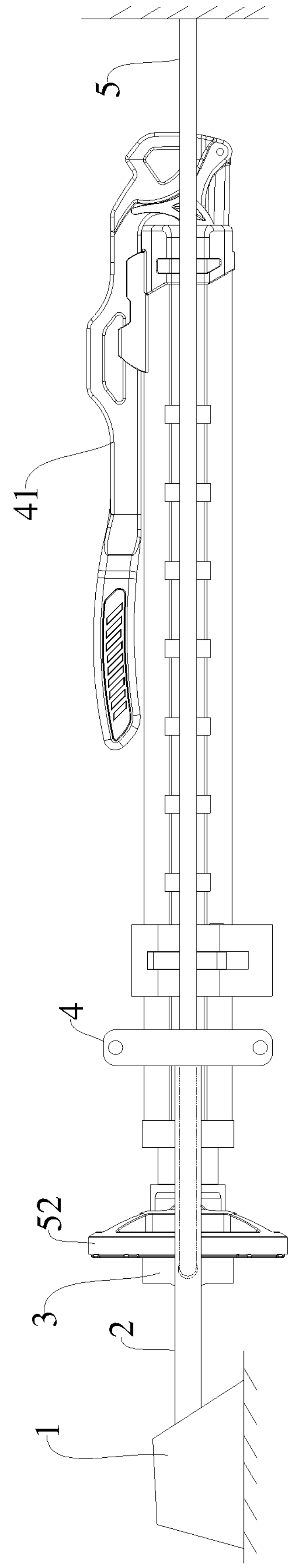
FIG. 17 is a schematic diagram of a hydraulic jack used as a manual winch according to embodiments of the present disclosure.

In some embodiments, the hydraulic jack also functions as a manual winch, and the specific use method is as follows. Referring to FIG. 17, a fiber rope 5 passes through a base attachment 3, a base 52, and a towing attachment 4 (which prevents overturning under force); one end of the fiber rope 5 is connected to a fixed object, and the other end of the fiber rope 5 is connected to the base 52 of the hydraulic jack; one end of a tow chain 2 is connected to an object 1 to be towed, and the other end of the tow chain 2 is fixed to the towing attachment 4 of the hydraulic jack; the handle 41 is pushed and pulled to realize the towing of the object 1; the tow chain 2 is hooked alternately by a hook on the base attachment 3 and a hook on the towing attachment 4, so that the object 1 will not slide towards an initial position during reciprocating motion of the hydraulic jack, thus realizing a function of the manual winch.

Referring to FIG. 3, FIG. 5, and FIGS. 7-10, embodiments of the present disclosure provide a hydraulic cylinder 10 that is used to be mounted in an oil barrel. Spaces at two ends of the hydraulic cylinder 10 are an oil loading chamber 20 and a storage oil chamber 30 respectively. The oil loading chamber 20 and the storage oil chamber 30 are sealed relative to each other, and the relative seal of the oil loading chamber 20 and the storage oil chamber 30 is realized by the hydraulic cylinder 10.

In some embodiments, the hydraulic cylinder 10 includes: an oil-circuit main body 101, an oil-circuit upper cover 102, and an oil-circuit lower cover 103. The hydraulic oil chamber running through the oil-circuit main body 101 is formed in the oil-circuit main body 101. A piston 13 is arranged in the hydraulic oil chamber, and the piston 13 divides the hydraulic oil chamber into a first hydraulic oil chamber 11 and a second hydraulic oil chamber 12. The piston 13 is connected to a piston rod 60.

The oil-circuit upper cover 102 seals an upper end of the hydraulic oil chamber, and the oil-circuit lower cover 103 seals a lower end of the hydraulic oil chamber. The piston rod 60 passes through the oil-circuit upper cover 102 and is connected to the piston 13. The first hydraulic oil chamber 11 has a first oil port, and the second hydraulic oil chamber 12 has a second oil port. The first oil port and the second oil port are both in unidirectional communication with the oil loading chamber 20, to allow unidirectional flow from the first oil port and the second oil port to the oil loading chamber 20. The first oil port and the second oil port are both in unidirectional communication with the storage oil chamber 30, to allow unidirectional flow from the storage oil chamber 30 to the first oil port and the second oil port.

Reciprocating motion of the piston 13 can change volumes of the first hydraulic oil chamber 11 and the second hydraulic oil chamber 12, so that one of the first oil port and the second oil port delivers hydraulic oil to the oil loading chamber 20, and the other thereof sucks the oil from the storage oil chamber 30.

Referring to FIGS. 11-16, embodiments of the present disclosure provide a bearing assembly 80 used for a hydraulic jack having an outer oil barrel 40, and the outer oil barrel 40 is provided with a snap groove 44.

The bearing assembly 80 includes a sliding block 81 and a pin 82; a bearing surface of the bearing assembly 80 can be arranged on the sliding block 81, and the sliding block 81 has a bore which can be fitted over a periphery of the outer oil barrel 40; the sliding block 81 is provide with a pin mounting groove 811, and the pin mounting groove 811 is in communication with the bore; the pin 82 is hinged in the pin mounting groove 811, and the pin 82 has an opening state and a locking state and can switch between the opening state and the locking state. In the opening state, the pin 82 is located outside the snap groove 44; in the locking state, the pin 82 has a partial structure located in the pin mounting groove 811 and a partial structure located in the snap groove 44, so that the sliding block 81 is fixed relative to the outer oil barrel 40.

In some embodiments, the bearing assembly 80 also includes a jacking block 83, and the jacking block 83 is mounted on the sliding block 81 and can move synchronously with the sliding block 81. The bearing surface of the bearing assembly 80 is arranged on the jacking block 83, and anti-skid stripes or anti-skid pads may be arranged on the bearing surface of the bearing assembly 80. Other structures and arrangement methods of the bearing assembly 80 can refer to the description about the hydraulic jack in the above embodiments, and will not be repeated here.

The technical features described in the above specific examples can be implemented in various configurations. Some examples of the configurations are provided below.

In some configurations, a hydraulic jack includes an outer oil barrel, a bearing assembly for bearing or pulling a weight is arranged on an outer wall of the outer oil barrel, the outer wall of the outer oil barrel has a plurality of fixing positions, and the bearing assembly can be fixed at any of the fixing positions and can move between any two of the fixing positions.

In some configurations, a snap groove is arranged in each of the fixing positions, and the bearing assembly includes: a sliding block, a pin and a jacking block. The sliding block is fitted over the outer wall of the outer oil barrel and can move relative to the outer oil barrel. The sliding block is provided with a pin mounting groove, and the pin is hinged to the pin mounting groove. The pin has an opening state and a locking state, and can switch between the opening state and the locking state. In the opening state, the sliding block can move relative to the outer oil barrel; in the locking state, the pin has a partial structure located in the pin mounting groove and has a partial structure located in the snap groove, so that the sliding block is fixed relative to the outer oil barrel. The jacking block is mounted on the sliding block and can move along with the sliding block.

In some configurations, an elastic pushing assembly is arranged on the sliding block, a groove is arranged on the pin, and the elastic pushing assembly abuts against the groove when the pin is in the locking state.

In some configurations, the elastic pushing assembly includes a screw, a spring and a push bead. The sliding block is provided with a mounting through hole; the screw, the spring and the push bead are arranged in the mounting through hole. The spring is compressed between the screw and the push bead, and a part of the push bead can be exposed from an end of the mounting through hole to abut against the groove.

In some configurations, the jacking block is detachably connected to the sliding block, or the jacking block and the sliding block are formed integrally.

In some configurations, an insertion groove is arranged in the sliding block, and the insertion groove includes a first guide portion and a limiting member. The jacking block has an insertion portion, and the insertion portion includes a second guide portion and a limiting block. The insertion portion can be inserted in the insertion groove, the second guide portion cooperates with the first guide portion, and the limiting block cooperates with the limiting member.

In some configurations, two pins are provided, two pin mounting grooves are arranged in the sliding block, and one pin is hinged to each pin mounting groove. The two pins are symmetrical about a center axis of the outer oil barrel.

In some configurations, the hydraulic jack also includes an inner oil barrel, a hydraulic cylinder and a piston rod; the outer oil barrel is fitted over the inner oil barrel and can move relative to the inner oil barrel; the outer oil barrel and the inner oil barrel form a storage oil chamber. The hydraulic cylinder is arranged in the inner oil barrel and can move along an axial direction of the inner oil barrel in a sealing manner. An oil loading chamber and the storage oil chamber are located at two ends of the hydraulic cylinder. A piston is arranged in the hydraulic cylinder and divides an interior of the hydraulic cylinder into a first hydraulic oil chamber and a second hydraulic oil chamber. The first hydraulic oil chamber has a first oil port, and the second hydraulic oil chamber has a second oil port. The first oil port and the second oil port are both in unidirectional communication with the oil loading chamber, to allow unidirectional flow from the first oil port and the second oil port to the oil loading chamber. The first oil port and the second oil port are both in unidirectional communication with the storage oil chamber, to allow unidirectional flow from the storage oil chamber to the first oil port and the second oil port. The hydraulic cylinder has an oil unloading pipeline that connects the oil loading chamber and the storage oil chamber, and an unloading switch is arranged at the oil unloading pipeline. A handle is hinged to the outer oil barrel. A first end of the piston rod is connected to the piston and a second end of the piston rod is connected to the handle, so that the handle can drive the piston to reciprocate through the piston rod, to change volumes of the first hydraulic oil chamber and the second hydraulic oil chamber. Thus, one of the first oil port and the second oil port delivers hydraulic oil to the oil loading chamber, and the other thereof sucks the oil from the storage oil chamber.

In some configurations, the outer oil barrel is provided with an oil barrel cover, and the oil barrel cover is arranged in a sealing manner at a top of the outer oil barrel. The handle is hinged to the oil barrel cover, and the piston rod passes through the oil barrel cover and is hinged with the handle.

In some configurations, the outer oil barrel is provided with a sleeve; the sleeve is fixedly connected to a bottom of the outer oil barrel; and the sleeve is fitted over the inner oil barrel and can slide along an outer wall of the inner oil barrel in a sealing manner.

In some configurations, a shaft sleeve is arranged on at least part of an inner wall of the sleeve; the shaft sleeve is arranged coaxially with the sleeve and fixed relative to the sleeve; and the sleeve is fitted over the outer wall of the inner oil barrel, and can move axially relative to the inner oil barrel.

In some configurations, a base sealing body is arranged at a bottom of the inner oil barrel, and the base sealing body seals the bottom of the inner oil barrel; a top of the inner oil barrel is located below the oil barrel cover and is open in an inner chamber of the outer oil barrel.

In some configurations, the base sealing body is connected to the base; a limiting member is arranged on the outer wall of the inner oil barrel and used to limit a motion range of the outer oil barrel; the limiting member is located at a position above a middle part of the inner oil barrel.

In some configurations, the hydraulic cylinder includes: an oil-circuit main body, an oil-circuit upper cover, and an oil-circuit lower cover. An outer wall of the oil-circuit main body is in sealing contact with an inner wall of the inner oil barrel, and the oil-circuit main body can move axially relative to the inner oil barrel. A hydraulic oil chamber running through the oil-circuit main body is formed in the oil-circuit main body, and the piston is arranged in the hydraulic oil chamber and divides the hydraulic oil chamber into the first hydraulic oil chamber and the second hydraulic oil chamber. The oil unloading pipeline is formed in the oil-circuit main body. The oil-circuit upper cover seals an upper end of the hydraulic oil chamber, and the oil-circuit lower cover seals a lower end of the hydraulic oil chamber. The piston rod passes through the oil-circuit upper cover and is connected to the piston.

In some configurations, the first oil port is in communication with the storage oil chamber through a first oil inlet line and is in communication with the oil loading chamber through a first oil outlet line; a first one-way valve is arranged at the first oil inlet line; and a second one-way valve is arranged at the first oil outlet line. The second oil port is in communication with the storage oil chamber through a second oil inlet line and is in communication with the oil loading chamber through a second oil outlet line; a third one-way valve is arranged at the second oil inlet line; and a fourth one-way valve is arranged at the second oil outlet line.

In some configurations, the first oil inlet line is formed in the oil-circuit upper cover, the first oil outlet line and the second oil inlet line are both formed in the oil-circuit main body, and the second oil outlet line is formed in the oil-circuit lower cover.

In some configurations, a first sink is formed at an upper end of the oil-circuit main body, and a second sink is formed at a lower end of the oil-circuit main body. At least a partial structure of the oil-circuit upper cover is arranged in the first sink, and at least a partial structure of the oil-circuit lower cover is arranged in the second sink. An inlet of the first oil outlet line is located in the first sink, and an outlet of the second oil inlet line is located in the second sink.

In some configurations, an oil unloading rod is arranged in the inner oil barrel, one end of the oil unloading rod is arranged at the oil unloading pipeline, and the other end of the oil unloading rod passes through the oil barrel cover and is connected to the oil unloading handle. The oil unloading handle is hinged to the oil barrel cover, and the communication and closing of the oil unloading pipeline can be controlled by the oil unloading rod.

In some configurations, a first overload protection oil circuit is connected between the first hydraulic oil chamber and the storage oil chamber, and a second overload protection oil circuit is connected between the second hydraulic oil chamber and the storage oil chamber.

In some configurations, the hydraulic cylinder includes: an oil-circuit main body, an oil-circuit upper cover, and an oil-circuit lower cover. An outer wall of the oil-circuit main body is in sealing contact with the inner wall of the inner oil barrel, and the oil-circuit main body can move axially relative to the inner oil barrel. A hydraulic oil chamber running through the oil-circuit main body is formed in the oil-circuit main body, and the piston is arranged in the hydraulic oil chamber and divides the hydraulic oil chamber into the first hydraulic oil chamber and the second hydraulic oil chamber. The oil-circuit upper cover seals an upper end of the hydraulic oil chamber, and the oil-circuit lower cover seals a lower end of the hydraulic oil chamber. The first overload protection oil circuit is arranged at the oil-circuit upper cover, and the second overload protection oil circuit is arranged at the piston rod.

In some configurations, a first pressure one-way valve is arranged at the first overload protection oil circuit, and a second pressure one-way valve is arranged at the second overload protection oil circuit. The first pressure one-way valve is opened when a pressure difference on both sides of the first pressure one-way valve is greater than a first preset value, and the second pressure one-way valve is opened when a pressure difference on both sides of the second pressure one-way valve is greater than a second preset value.

In some configurations, a piston barrel is fitted over the piston rod, one end of the piston barrel is connected to the oil barrel cover, and the other end of the piston barrel is connected to the hydraulic cylinder.

In some configurations, the piston rod includes an upper piston rod and a lower piston rod connected to each other, the upper piston rod is connected to the handle, and the lower piston rod is connected to the piston.

In some configurations, a bearing assembly is used for a hydraulic jack having an outer oil barrel, and the outer oil barrel is provided with a snap groove. The bearing assembly includes a sliding block and a pin. The sliding block has a bore which can be fitted over a periphery of the outer oil barrel. The sliding block is provided with a pin mounting groove, and the pin mounting groove is in communication with the bore. The pin is hinged to the pin mounting groove, and the pin has an opening state and a locking state and can switch between the opening state and the locking state. In the opening state, the pin is located outside the snap groove; in the locking state, the pin has a partial structure located in the pin mounting groove and a partial structure located in the snap groove, so that the sliding block is fixed relative to the outer oil barrel.

In some configurations, the bearing assembly also includes a jacking block, and the jacking block is mounted on the sliding block and can move synchronously with the sliding block.

In some configurations, an elastic pushing assembly is arranged on the sliding block, a groove is arranged on the pin, and the elastic pushing assembly abuts against the groove when the pin is in the locking state.

In some configurations, the elastic pushing assembly includes a screw, a spring, and a push bead. The sliding block is provided with a mounting through hole; and the screw, the spring, and the push bead are arranged in the mounting through hole. The spring is compressed between the screw and the push bead, and a part of the push bead can be exposed from an end of the mounting through hole to abut against the groove.

In some configurations, the jacking block is detachably connected to the sliding block, or the jacking block is formed integrally with the sliding block.

In some configurations, an insertion groove is arranged in the sliding block, and the insertion groove includes a first guide portion and a limiting member. The jacking block has an insertion portion, and the insertion portion includes a second guide portion and a limiting block. The insertion portion can be inserted in the insertion groove, the second guide portion cooperates with the first guide portion, and the limiting block cooperates with the limiting member.

In some configurations, two pins are provided, two pin mounting grooves are arranged in the sliding block, and one pin is hinged to each pin mounting groove. The two pins are symmetrical about a center axis of the outer oil barrel.

In some configurations, the hydraulic jack includes an outer oil barrel, and the bearing assembly according to any one of the above configurations is arranged on an outer wall of the outer oil barrel. The outer wall of the outer oil barrel has a plurality of fixing positions, and a snap groove is arranged in each of the fixing positions. The bearing assembly can move to any of the fixing positions and be fixed to the outer oil barrel by the snap groove. The bearing assembly can move between any two fixing positions.

In some configurations, the hydraulic jack also includes an inner oil barrel, a hydraulic cylinder and a piston rod; the outer oil barrel is fitted over the inner oil barrel and can move relative to the inner oil barrel; the outer oil barrel and the inner oil barrel form a storage oil chamber. The hydraulic cylinder is arranged in the inner oil barrel and can move along an axial direction of the inner oil barrel in a sealing manner. An oil loading chamber and the storage oil chamber are located at two ends of the hydraulic cylinder. A piston is arranged in the hydraulic cylinder and divides an interior of the hydraulic cylinder into a first hydraulic oil chamber and a second hydraulic oil chamber. The first hydraulic oil chamber has a first oil port, and the second hydraulic oil chamber has a second oil port. The first oil port and the second oil port are both in unidirectional communication with the oil loading chamber, to allow unidirectional flow from the first oil port and the second oil port to the oil loading chamber. The first oil port and the second oil port are both in unidirectional communication with the storage oil chamber, to allow unidirectional flow from the storage oil chamber to the first oil port and the second oil port. The hydraulic cylinder has an oil unloading pipeline that connects the oil loading chamber and the storage oil chamber, and an unloading switch is arranged at the oil unloading pipeline. A handle is hinged to the outer oil barrel. A first end of the piston rod is connected to the piston and a second end of the piston rod is connected to the handle, so that the handle can drive the piston to reciprocate through the piston rod, to change volumes of the first hydraulic oil chamber and the second hydraulic oil chamber. Thus, one of the first oil port and the second oil port delivers hydraulic oil to the oil loading chamber, and the other thereof sucks the oil from the storage oil chamber.

In some configurations, the hydraulic cylinder includes: an oil-circuit main body, an oil-circuit upper cover, and an oil-circuit lower cover. An outer wall of the oil-circuit main body is in sealing contact with an inner wall of the inner oil barrel, and the oil-circuit main body can move axially relative to the inner oil barrel. A hydraulic oil chamber running through the oil-circuit main body is formed in the oil-circuit main body, and the piston is arranged in the hydraulic oil chamber and divides the hydraulic oil chamber into the first hydraulic oil chamber and the second hydraulic oil chamber. The oil unloading pipeline is formed in the oil-circuit main body. The oil-circuit upper cover seals an upper end of the hydraulic oil chamber, and the oil-circuit lower cover seals a lower end of the hydraulic oil chamber. The piston rod passes through the oil-circuit upper cover and is connected to the piston.

In some configurations, a hydraulic cylinder is used to be mounted in an oil barrel. Spaces at two ends of the hydraulic cylinder are an oil loading chamber and a storage oil chamber respectively. The oil loading chamber and the storage oil chamber are sealed relative to each other. The hydraulic cylinder includes: an oil-circuit main body, an oil-circuit upper cover, and an oil-circuit lower cover. A hydraulic oil chamber running through the oil-circuit main body is formed in the oil-circuit main body, and a piston is arranged in the hydraulic oil chamber. The piston divides the hydraulic oil chamber into a first hydraulic oil chamber and a second hydraulic oil chamber, and the piston is connected to a piston rod. The oil-circuit upper cover seals an upper end of the hydraulic oil chamber, and the oil-circuit lower cover seals a lower end of the hydraulic oil chamber. The piston rod passes through the oil-circuit upper cover and is connected to the piston. The first hydraulic oil chamber has a first oil port, and the second hydraulic oil chamber has a second oil port. The first oil port and the second oil port are both in unidirectional communication with the oil loading chamber, to allow unidirectional flow from the first oil port and the second oil port to the oil loading chamber. The first oil port and the second oil port are both in unidirectional communication with the storage oil chamber, to allow unidirectional flow from the storage oil chamber to the first oil port and the second oil port. Reciprocating motion of the piston can change volumes of the first hydraulic oil chamber and the second hydraulic oil chamber, so that one of the first oil port and the second oil port delivers hydraulic oil to the oil loading chamber, and the other thereof sucks the oil from the storage oil chamber.

In some configurations, the hydraulic cylinder has an oil unloading pipeline that connects the oil loading chamber and the storage oil chamber. An unloading switch is arranged at the oil unloading pipeline, and the unloading switch can control opening and closing of the oil unloading pipeline.

In some configurations, the first oil port is in communication with the storage oil chamber through a first oil inlet line and is in communication with the oil loading chamber through a first oil outlet line; a first one-way valve is arranged at the first oil inlet line; and a second one-way valve is arranged at the first oil outlet line. The second oil port is in communication with the storage oil chamber through a second oil inlet line and is in communication with the oil loading chamber through a second oil outlet line; a third one-way valve is arranged at the second oil inlet line; and a fourth one-way valve is arranged at the second oil outlet line.

In some configurations, the first oil inlet line is formed in the oil-circuit upper cover, the first oil outlet line and the second oil inlet line are formed in the oil-circuit main body, and the second oil outlet line is formed in the oil-circuit lower cover; the oil unloading pipeline is formed in the oil-circuit main body.

In some configurations, a first sink is formed at an upper end of the oil-circuit main body, and a second sink is formed at a lower end of the oil-circuit main body. At least a partial structure of the oil-circuit upper cover is arranged in the first sink, and at least a partial structure of the oil-circuit lower cover is arranged in the second sink. An inlet of the first oil outlet line is located in the first sink, and an outlet of the second oil inlet line is located in the second sink.

In some configurations, a hydraulic jack includes: an outer oil barrel provided with a handle; an inner oil barrel, the outer oil barrel being fitted over the inner oil barrel and movable relative to the inner oil barrel, and the outer oil barrel and the inner oil barrel together forming a storage oil chamber; the hydraulic cylinder according to any one of the above configurations, arranged in the inner oil barrel and movable along an axial direction of the inner oil barrel in a sealing manner, an oil loading chamber and a storage oil chamber being located at two ends of the hydraulic cylinder. A first end of the piston rod is connected to the piston and a second end of the piston rod is connected to the handle, so that the handle can drive the piston to reciprocate through the piston rod, to change the volumes of the first hydraulic oil chamber and the second hydraulic oil chamber. Thus, one of the first oil port and the second oil port delivers the hydraulic oil to the oil loading chamber, and the other thereof sucks the oil from the storage oil chamber.

In some configurations, the outer oil barrel is provided with an oil barrel cover, and the oil barrel cover is arranged in a sealing manner at a top of the outer oil barrel. The handle is hinged to the oil barrel cover, and the piston rod passes through the oil barrel cover and is hinged with the handle.

In some configurations, the outer oil barrel is provided with a sleeve; the sleeve is fixedly connected to a bottom of the outer oil barrel; and the sleeve is fitted over the inner oil barrel and can slide along an outer wall of the inner oil barrel in a sealing manner.

In some configurations, a shaft sleeve is arranged on at least part of an inner wall of the sleeve; the shaft sleeve is arranged coaxially with the sleeve and fixed relative to the sleeve; and the sleeve is fitted over the outer wall of the inner oil barrel, and can move axially relative to the inner oil barrel.

In some configurations, a base sealing body is arranged at a bottom of the inner oil barrel, and the base sealing body seals the bottom of the inner oil barrel; a top of the inner oil barrel is located below the oil barrel cover and is open in an inner chamber of the outer oil barrel.

In the description of the present disclosure, it shall be understood that terms such as “central,” “longitudinal,” “transverse,” “length,” “width,” “thickness,” “upper,” “lower,” “front,” “rear,” “left,” “right,” “vertical,” “horizontal,” “top,” “bottom,” “inner,” “outer,” “clockwise,” “counterclockwise,” “axial,” “radial” and “circumferential” should be construed to refer to the orientation as then described or as shown in the drawings under discussion. These relative terms are for convenience of description and do not indicate or imply that the device or element referred to must have a particular orientation, or be constructed and operated in a particular orientation. Thus, these terms shall not be construed as limitation on the present disclosure.

In addition, terms such as “first” and “second” are merely used for descriptive purposes and cannot be understood as indicating or implying relative importance or the number of technical features indicated. Thus, the features associated with “first” and “second” may explicitly or implicitly include at least one of the features. In the description of the present disclosure, unless otherwise specifically defined, “a plurality of” means at least two, such as two, three, etc.

In the present disclosure, unless otherwise explicitly specified and defined, the terms “mounted,” “connected,” “coupled,” “fixed” and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless otherwise explicitly specified and defined, a structure in which a first feature is “on” or “below” a second feature may include an embodiment in which the first feature is in direct contact with the second feature, and may also include an embodiment in which the first feature and the second feature are not in direct contact with each other, but are contacted via an additional feature formed therebetween. Furthermore, a first feature “on,” “above,” or “on top of” a second feature may include an embodiment in which the first feature is right or obliquely “on,” “above,” or “on top of” the second feature, or just means that the first feature is at a height higher than that of the second feature; while a first feature “below,” “under,” or “on bottom of” a second feature may include an embodiment in which the first feature is right or obliquely “below,” “under,” or “on bottom of” the second feature, or just means that the first feature is at a height lower than that of the second feature.

In the present disclosure, terms such as “an embodiment,” “some embodiments,” “an example,” “a specific example,” or “some examples,” means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are exemplary and shall not be understood as limitation on the present disclosure, and changes, modifications, alternatives and variations can be made in the above embodiments within the scope of the present disclosure.

What is claimed is:

1. A hydraulic jack, comprising:

an outer oil barrel, a handle being arranged on the outer oil barrel;

an inner oil barrel, the outer oil barrel being fitted over the inner oil barrel and movable relative to the inner oil barrel, the outer oil barrel and the inner oil barrel forming a storage oil chamber;

a hydraulic cylinder arranged in the inner oil barrel and movable along an axial direction of the inner oil barrel in a sealing manner, wherein an oil loading chamber and the storage oil chamber are disposed at two ends of the hydraulic cylinder, respectively, a piston is arranged in the hydraulic cylinder and divides an interior of the hydraulic cylinder into a first hydraulic oil chamber and a second hydraulic oil chamber, the first hydraulic oil chamber has a first oil port, the second hydraulic oil chamber has a second oil port, the first oil port and the second oil port are both configured to be in unidirectional communication with the oil loading chamber to allow unidirectional flow from the first oil port and the second oil port to the oil loading chamber, the first oil port and the second oil port are both configured to be in unidirectional communication with the storage oil chamber to allow unidirectional flow from the storage oil chamber to the first oil port and the second oil port, and the hydraulic cylinder has an oil unloading pipeline connecting the oil loading chamber with the storage oil chamber; and a piston rod having a first end connected to the piston and a second end connected to the handle, wherein the handle drives the piston to reciprocate through the piston rod to change volumes of the first hydraulic oil chamber and the second hydraulic oil chamber, and one of the first oil port and the second oil port is configured to deliver hydraulic oil to the oil loading chamber, while the other of the first oil port and the second oil port sucks oil from the storage oil chamber.

2. The hydraulic jack according to claim 1, wherein the outer oil barrel includes an oil barrel cover, the oil barrel cover is arranged in a sealing manner at a top of the outer oil barrel, the handle is hinged to the oil barrel cover, and the piston rod passes through the oil barrel cover and is hinged with the handle.

3. The hydraulic jack according to claim 2, wherein the outer oil barrel includes a sleeve, the sleeve is fixedly connected to a bottom of the outer oil barrel, and the sleeve is fitted over the inner oil barrel and slidable along an outer wall of the inner oil barrel in a sealing manner.

4. The hydraulic jack according to claim 3, wherein a shaft sleeve is arranged on at least part of an inner wall of the sleeve, the shaft sleeve is arranged coaxially with the sleeve and fixed relative to the sleeve, and the sleeve is fitted over the outer wall of the inner oil barrel and is axially movable relative to the inner oil barrel.

5. The hydraulic jack according to claim 2, wherein a base sealing body is arranged on a bottom of the inner oil barrel, the base sealing body sealing the bottom of the inner oil barrel, a top of the inner oil barrel is positioned below the oil barrel cover and is open in an inner chamber of the outer oil barrel.

6. The hydraulic jack according to claim 1,
wherein the hydraulic cylinder comprises:
an oil-circuit main body;
an oil-circuit upper cover; and
an oil-circuit lower cover,
wherein an outer wall of the oil-circuit main body is in sealing contact with an inner wall of the inner oil barrel, and the oil-circuit main body is axially movable relative to the inner oil barrel,
wherein a hydraulic oil chamber running through the oil-circuit main body is disposed in the oil-circuit main body, and the piston is arranged in the hydraulic oil chamber and divides the hydraulic oil chamber into the first hydraulic oil chamber and the second hydraulic oil chamber,
wherein the oil unloading pipeline is disposed in the oil-circuit main body, and
wherein the oil-circuit upper cover seals an upper end of the hydraulic oil chamber, the oil-circuit lower cover seals a lower end of the hydraulic oil chamber, and the piston rod passes through the oil-circuit upper cover and is connected to the piston.

7. The hydraulic jack according to claim 6,
wherein the first oil port is configured to be in communication with the storage oil chamber through a first oil inlet line and is configured to be in communication with the oil loading chamber through a first oil outlet line, a first one-way valve is arranged at the first oil inlet line, and a second one-way valve is arranged at the first oil outlet line,
wherein the second oil port is configured to be in communication with the storage oil chamber through a second oil inlet line and is configured to be in communication with the oil loading chamber through a second oil outlet line, a third one-way valve is arranged at the second oil inlet line, and a fourth one-way valve is arranged at the second oil outlet line.

8. The hydraulic jack according to claim 7, wherein the first oil inlet line is disposed in the oil-circuit upper cover, the first oil outlet line and the second oil inlet line are both disposed in the oil-circuit main body, and the second oil outlet line is disposed in the oil-circuit lower cover.

9. The hydraulic jack according to claim 8,
wherein a first sink is disposed in an upper end of the oil-circuit main body, a second sink is disposed in a lower end of the oil-circuit main body, at least a partial structure of the oil-circuit upper cover is arranged in the first sink, and at least a partial structure of the oil-circuit lower cover is arranged in the second sink,
wherein an inlet of the first oil outlet line is positioned in the first sink, and an outlet of the second oil inlet line is positioned in the second sink.

10. The hydraulic jack according to claim 2, wherein an oil unloading rod is arranged in the inner oil barrel, a first end of the oil unloading rod is arranged at the oil unloading pipeline, a second end of the oil unloading rod passes through the oil barrel cover and is connected to an oil unloading handle, and the oil unloading handle is hinged to the oil barrel cover and is configured to control communication and closing of the oil unloading pipeline by the oil unloading rod.

11. The hydraulic jack according to claim 1, wherein a first overload protection oil circuit is connected between the first hydraulic oil chamber and the storage oil chamber, and a second overload protection oil circuit is connected between the second hydraulic oil chamber and the storage oil chamber.

12. The hydraulic jack according to claim 11, wherein the hydraulic cylinder comprises:
an oil-circuit main body;
an oil-circuit upper cover; and
an oil-circuit lower cover,
wherein an outer wall of the oil-circuit main body is in sealing contact with an inner wall of the inner oil barrel, and the oil-circuit main body is axially movable relative to the inner oil barrel,
wherein a hydraulic oil chamber running through the oil-circuit main body is disposed in the oil-circuit main body, and the piston is arranged in the hydraulic oil chamber and divides the hydraulic oil chamber into the first hydraulic oil chamber and the second hydraulic oil chamber,
wherein the oil-circuit upper cover seals an upper end of the hydraulic oil chamber, and the oil-circuit lower cover seals a lower end of the hydraulic oil chamber,
wherein the first overload protection oil circuit is arranged at the oil-circuit upper cover, and the second overload protection oil circuit is arranged at the piston rod.

13. The hydraulic jack according to claim 2, wherein a piston barrel is fitted over the piston rod, a first end of the piston barrel is connected to the oil barrel cover, and a second end of the piston barrel is connected to the hydraulic cylinder.

14. The hydraulic jack according to claim 1, wherein the piston rod comprises an upper piston rod and a lower piston rod connected with each other, the upper piston rod is connected to the handle, and the lower piston rod is connected to the piston.

15. The hydraulic jack according to claim 1, wherein a bearing assembly is arranged on an outer wall of the outer oil barrel, the outer wall of the outer oil barrel has a plurality of fixing positions, and the bearing assembly is configured to be fixed at any of the plurality of fixing positions and movable between any two of the plurality of fixing positions.

16. The hydraulic jack according to claim 15,
wherein a snap groove is arranged in each of the plurality of fixing positions, and
wherein the bearing assembly comprises:
a sliding block fitted over the outer wall of the outer oil barrel and being movable relative to the outer oil barrel, a pin mounting groove being arranged in the sliding block,
a pin hinged to the pin mounting groove, having an opening state and a locking state, and being switchable between the opening state and the locking state, wherein in the opening state, the sliding block is movable relative to the outer oil barrel, and in the locking state, one part of the pin is disposed in the pin mounting groove and another part of the pin is disposed in the snap groove, such that the sliding block is fixed relative to the outer oil barrel;

a jacking block mounted on the sliding block and being movable along with the sliding block.

17. The hydraulic jack according to claim 16, wherein an elastic pushing assembly is arranged on the sliding block, a groove is arranged in the pin, and the elastic pushing assembly abuts against the groove when the pin is in the locking state.

18. The hydraulic jack according to claim 17, wherein the elastic pushing assembly comprises:

a screw;

a spring; and a push bead, wherein the sliding block includes an mounting through hole, and the screw, the spring and the push bead are arranged in the mounting through hole, wherein the spring is compressed between the screw and the push bead, and a part of the push bead is exposed from an end of the mounting through hole and abuts against the groove.

* * * * *